(12) United States Patent
Smith et al.

(10) Patent No.: US 8,359,005 B2
(45) Date of Patent: *Jan. 22, 2013

(54) SYSTEMS AND METHODS TO PROCESS TRANSACTION REQUESTS

(75) Inventors: Glyn Barry Smith, Chesterfield (GB); Jonathan Michael Kingston, Chesterfield (GB)

(73) Assignee: Boku, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/366,793

(22) Filed: Feb. 6, 2012

(65) Prior Publication Data
US 2012/0142312 A1  Jun. 7, 2012

Related U.S. Application Data

(63) Continuation of application No. 12/478,725, filed on Jun. 4, 2009, now Pat. No. 8,131,258.

(60) Provisional application No. 61/170,953, filed on Apr. 20, 2009.

(51) Int. Cl.
*H04M 11/00* (2006.01)

(52) U.S. Cl. ........ 455/407; 455/466; 713/167; 713/168; 713/173; 370/389; 370/390

(58) Field of Classification Search .................. 455/407, 455/466; 713/167, 168, 176, 173; 370/389, 370/390
See application file for complete search history.

(56) References Cited

U.S. PATENT DOCUMENTS

| | | | |
|---|---|---|---|
| 5,708,422 A | 1/1998 | Blonder et al. | |
| 5,845,260 A | 12/1998 | Nakano et al. | |
| 5,905,873 A | 5/1999 | Hartmann et al. | |
| 5,914,472 A | 6/1999 | Foladare et al. | |
| 5,953,710 A | 9/1999 | Fleming | |
| 6,227,447 B1 | 5/2001 | Campisano | |
| 6,302,326 B1 | 10/2001 | Symonds et al. | |

(Continued)

FOREIGN PATENT DOCUMENTS

GB  2379525  3/2003

(Continued)

OTHER PUBLICATIONS

Zong payment methods at www.zong.com.*

(Continued)

*Primary Examiner* — Kamran Afshar
*Assistant Examiner* — Manpreet Matharu
(74) *Attorney, Agent, or Firm* — Stephen M. De Klerk

(57) ABSTRACT

Systems and methods are provided to facilitate on-site processing of transaction requests. In one aspect, a system includes a data storage facility to store an account identifier of a user and a phone number of the user and an interchange coupled with the data storage facility. The interchange includes a common format processor and a plurality of converters to interface with a plurality of different controllers of mobile communications. The converters are configured to communicate with the controllers in different formats and to communicate with the common format processor in a common format to transmit a message to a telephone at the telephone number of the user to prompt the user to confirm a request and to receive a confirmation of the request via the telephone. The request is received via a user interface embedded in a web page of a first website without reloading or refreshing the web page.

18 Claims, 14 Drawing Sheets

U.S. PATENT DOCUMENTS

| | | |
|---|---|---|
| 6,473,808 B1 | 10/2002 | Yeivin et al. |
| 6,612,488 B2 | 9/2003 | Suzuki |
| 6,718,178 B1 | 4/2004 | Sladek et al. |
| 6,788,771 B2 | 9/2004 | Manto |
| 6,807,410 B1 | 10/2004 | Pailles et al. |
| 6,928,558 B1 | 8/2005 | Allahwerdi et al. |
| 6,965,872 B1 | 11/2005 | Grdina |
| 6,996,409 B2 | 2/2006 | Gopinath et al. |
| 7,013,125 B2 | 3/2006 | Henrikson |
| 7,107,068 B2 | 9/2006 | Benzon et al. |
| 7,174,301 B2 | 2/2007 | Florance et al. |
| 7,221,951 B2 | 5/2007 | Anvekar et al. |
| 7,292,996 B2 | 11/2007 | Nobrega et al. |
| 7,308,254 B1 | 12/2007 | Rissanen |
| 7,315,541 B1 | 1/2008 | Housel et al. |
| 7,331,518 B2 | 2/2008 | Rable |
| 7,357,310 B2 | 4/2008 | Calabrese et al. |
| 7,366,702 B2 | 4/2008 | David |
| 7,374,079 B2 | 5/2008 | Nam et al. |
| 7,437,331 B1 | 10/2008 | Rosenberger |
| 7,458,507 B2 | 12/2008 | Fillinger et al. |
| 7,478,055 B2 | 1/2009 | Goino |
| 7,487,114 B2 | 2/2009 | Florance et al. |
| 7,748,614 B2 | 7/2010 | Brown |
| 7,752,135 B2 | 7/2010 | Brown et al. |
| 7,870,077 B2 | 1/2011 | Woo et al. |
| 7,890,433 B2 | 2/2011 | Singhal |
| 2001/0003093 A1 | 6/2001 | Lundin |
| 2001/0037264 A1 | 11/2001 | Husemann et al. |
| 2002/0013727 A1 | 1/2002 | Lee |
| 2002/0016769 A1 | 2/2002 | Barbara et al. |
| 2002/0035539 A1 | 3/2002 | O'Connell |
| 2002/0059146 A1 | 5/2002 | Keech |
| 2002/0087471 A1 | 7/2002 | Ganesan et al. |
| 2002/0120582 A1 | 8/2002 | Elston et al. |
| 2002/0193094 A1 | 12/2002 | Lawless et al. |
| 2003/0065525 A1* | 4/2003 | Giacchetti et al. ................. 705/1 |
| 2003/0119478 A1 | 6/2003 | Nagy et al. |
| 2003/0125969 A1 | 7/2003 | Kizer et al. |
| 2003/0126076 A1 | 7/2003 | Kwok |
| 2004/0019564 A1 | 1/2004 | Goldthwaite et al. |
| 2004/0044582 A1 | 3/2004 | Chowdhary |
| 2004/0122685 A1 | 6/2004 | Bunce |
| 2004/0248596 A1 | 12/2004 | Panchal |
| 2005/0055296 A1 | 3/2005 | Hattersley et al. |
| 2005/0055309 A1 | 3/2005 | Williams et al. |
| 2005/0177442 A1 | 8/2005 | Sullivan et al. |
| 2005/0177517 A1 | 8/2005 | Leung et al. |
| 2005/0199709 A1 | 9/2005 | Linlor |
| 2005/0245257 A1 | 11/2005 | Woodhill |
| 2006/0131390 A1 | 6/2006 | Kim |
| 2006/0206709 A1* | 9/2006 | Labrou et al. ................. 713/167 |
| 2006/0253335 A1 | 11/2006 | Keena et al. |
| 2006/0258331 A1 | 11/2006 | Syrett et al. |
| 2006/0259438 A1 | 11/2006 | Randle et al. |
| 2006/0276171 A1 | 12/2006 | Pousti |
| 2007/0005467 A1 | 1/2007 | Haigh et al. |
| 2007/0022019 A1 | 1/2007 | Sherwin et al. |
| 2007/0027775 A1 | 2/2007 | Hwang |
| 2007/0027803 A1 | 2/2007 | Brandes et al. |
| 2007/0043664 A1 | 2/2007 | Wilkes |
| 2007/0055440 A1 | 3/2007 | Denker et al. |
| 2007/0061244 A1 | 3/2007 | Ramer et al. |
| 2007/0094080 A1 | 4/2007 | Wiken |
| 2007/0118477 A1 | 5/2007 | Graves et al. |
| 2007/0123219 A1 | 5/2007 | Lovell, Jr. |
| 2007/0123229 A1 | 5/2007 | Pousti |
| 2007/0130025 A1 | 6/2007 | Nakajima |
| 2007/0130044 A1 | 6/2007 | Rowan |
| 2007/0175978 A1 | 8/2007 | Stambaugh |
| 2007/0198510 A1 | 8/2007 | Ebanks |
| 2007/0203836 A1 | 8/2007 | Dodin |
| 2007/0208632 A1 | 9/2007 | Downes et al. |
| 2007/0233597 A1 | 10/2007 | Petersen et al. |
| 2007/0244731 A1 | 10/2007 | Barhydt et al. |
| 2007/0244811 A1 | 10/2007 | Tumminaro et al. |
| 2007/0255653 A1 | 11/2007 | Tumminard et al. |
| 2007/0255662 A1 | 11/2007 | Tumminaro et al. |
| 2007/0260556 A1 | 11/2007 | Pousti |
| 2007/0266034 A1 | 11/2007 | Pousti |
| 2007/0266130 A1 | 11/2007 | Mazur et al. |
| 2007/0270125 A1 | 11/2007 | Pousti |
| 2008/0009263 A1 | 1/2008 | Pousti |
| 2008/0010192 A1 | 1/2008 | Rackley, III et al. |
| 2008/0040139 A1 | 2/2008 | Pousti |
| 2008/0040265 A1 | 2/2008 | Rackley, III et al. |
| 2008/0040733 A1 | 2/2008 | Pousti |
| 2008/0052091 A1 | 2/2008 | Vawter |
| 2008/0052363 A1 | 2/2008 | Pousti |
| 2008/0057904 A1 | 3/2008 | Pousti |
| 2008/0082509 A1* | 4/2008 | Bessieres et al. ................. 707/3 |
| 2008/0091614 A1 | 4/2008 | Bas Bayod et al. |
| 2008/0103984 A1 | 5/2008 | Choe et al. |
| 2008/0109279 A1 | 5/2008 | Csoka |
| 2008/0109528 A1 | 5/2008 | Knight et al. |
| 2008/0120698 A1 | 5/2008 | Ramia |
| 2008/0126145 A1 | 5/2008 | Rackley, III et al. |
| 2008/0133403 A1 | 6/2008 | Hamzeh |
| 2008/0133735 A1 | 6/2008 | Thayer et al. |
| 2008/0140569 A1 | 6/2008 | Handel |
| 2008/0154772 A1 | 6/2008 | Carlson |
| 2008/0167017 A1 | 7/2008 | Wentker et al. |
| 2008/0177628 A1 | 7/2008 | Payette |
| 2008/0189186 A1 | 8/2008 | Choi et al. |
| 2008/0189211 A1 | 8/2008 | Obadia et al. |
| 2008/0201201 A1 | 8/2008 | Pousti |
| 2008/0208739 A1 | 8/2008 | Phillips |
| 2008/0228595 A1 | 9/2008 | Hill et al. |
| 2008/0233918 A1 | 9/2008 | Pousti |
| 2008/0275779 A1 | 11/2008 | Lakshminarayanan |
| 2008/0287095 A1 | 11/2008 | Pousti |
| 2008/0288299 A1 | 11/2008 | Schultz |
| 2009/0006184 A1 | 1/2009 | Leach et al. |
| 2009/0006217 A1 | 1/2009 | Smith |
| 2009/0024614 A1 | 1/2009 | Pousti |
| 2009/0029687 A1 | 1/2009 | Ramer et al. |
| 2009/0063178 A1 | 3/2009 | Pousti et al. |
| 2009/0063312 A1 | 3/2009 | Hurst |
| 2009/0070583 A1 | 3/2009 | Von Mueller et al. |
| 2009/0081989 A1 | 3/2009 | Wuhrer |
| 2009/0112765 A1 | 4/2009 | Skowronek |
| 2009/0119190 A1 | 5/2009 | Realinij |
| 2009/0124238 A1 | 5/2009 | Wilson |
| 2009/0156170 A1 | 6/2009 | Rossano et al. |
| 2009/0172402 A1 | 7/2009 | Tran |
| 2009/0182634 A1 | 7/2009 | Park et al. |
| 2009/0192928 A1 | 7/2009 | Abifaker |
| 2009/0204546 A1 | 8/2009 | Haidar |
| 2009/0220060 A1 | 9/2009 | Wilson |
| 2009/0265273 A1 | 10/2009 | Guntupali et al. |
| 2010/0010911 A1 | 1/2010 | Smith |
| 2010/0015944 A1 | 1/2010 | Smith |
| 2010/0015957 A1 | 1/2010 | Smith |
| 2010/0017285 A1 | 1/2010 | Smith |
| 2010/0094732 A1 | 4/2010 | Smith |
| 2010/0125514 A1 | 5/2010 | Blackhurst et al. |
| 2010/0153249 A1 | 6/2010 | Yuan et al. |
| 2010/0179907 A1 | 7/2010 | Atkinson |
| 2010/0190471 A1 | 7/2010 | Smith |
| 2010/0191646 A1 | 7/2010 | Smith |
| 2010/0191648 A1 | 7/2010 | Smith |
| 2010/0216425 A1 | 8/2010 | Smith |
| 2010/0217696 A1 | 8/2010 | Schuba et al. |
| 2010/0223183 A1 | 9/2010 | Smith |
| 2010/0235276 A1 | 9/2010 | Smith |
| 2010/0250687 A1 | 9/2010 | Smith |
| 2010/0299220 A1 | 11/2010 | Baskerville |
| 2010/0299731 A1 | 11/2010 | Atkinson |
| 2010/0306015 A1 | 12/2010 | Kingston |
| 2010/0306099 A1 | 12/2010 | Hirson |
| 2010/0312645 A1 | 12/2010 | Niejadlik |
| 2010/0312678 A1 | 12/2010 | Davis |
| 2011/0010292 A1 | 1/2011 | Giordano et al. |
| 2011/0022484 A1 | 1/2011 | Smith et al. |
| 2011/0035264 A1 | 2/2011 | Zaloom |
| 2011/0035302 A1 | 2/2011 | Martell et al. |
| 2011/0071922 A1 | 3/2011 | Hirson et al. |

| | | | |
|---|---|---|---|
| 2011/0072039 | A1 | 3/2011 | Tayloe |
| 2011/0078077 | A1 | 3/2011 | Hirson |
| 2011/0082772 | A1 | 4/2011 | Hirson |
| 2011/0125610 | A1 | 5/2011 | Goodsall et al. |
| 2011/0143710 | A1 | 6/2011 | Hirson |
| 2011/0143711 | A1 | 6/2011 | Hirson |

FOREIGN PATENT DOCUMENTS

| | | |
|---|---|---|
| JP | 2007109014 | 4/2007 |
| JP | 2007179383 | 7/2007 |
| KR | 20000036574 | 7/2000 |
| KR | 20030030684 | 4/2003 |
| KR | 20060103797 | 10/2006 |
| KR | 20070051817 | 5/2007 |
| KR | 20070103650 | 10/2007 |
| KR | 20080011338 | 2/2008 |
| WO | 9738538 | 10/1997 |
| WO | WO-2007004792 | 1/2007 |
| WO | WO-2007084593 | 7/2007 |
| WO | 2007102648 | 9/2007 |
| WO | 2007127521 | 11/2007 |
| WO | 2009044396 | 4/2009 |

OTHER PUBLICATIONS

Amazon.com, Inc., "Get Gold Box Deals Every Day with Amazon Text Alerts," located at http://www.amazon.com/gp/anywhere/sms/goldbox, available at least by Jun. 10, 2009.

Aradiom Inc., "The Real Solution—Aradiom SolidPass", located at http://www.aradiom.com/SolidPass/2fa-OTP-security-token.htm, available at least by Apr. 24, 2009.

Chua, Lye Heng, "How Customers Applied Java CAPS?" Sun Microsystems, Inc. presentation, Nov. 6, 2007.

Hassinen, Marko et al., "An Open, PKI-Based Mobile Payment System," Emerging Trends in Information and Communication Security, Lecture Notes in Computer Science, vol. 3995/2006, pp. 86-89, Jun. 1, 2006.

International Application No. PCT/US2009/033823, International Search Report and Written Opinion, Sep. 24, 2009.

International Application No. PCT/US2009/039723, International Search Report and Written Opinion, Oct. 30, 2009.

International Application No. PCT/US2010/020189, International Search Report and Written Opinion, Dec. 10, 2010.

International Application No. PCT/US2010/021054, International Search Report and Written Opinion, Jul. 29, 2010.

International Application No. PCT/US2010/024525, International Search Report and Written Opinion, May 17, 2010.

International Application No. PCT/US2010/024535, International Search Report and Written Opinion, May 25, 2010.

International Application No. PCT/US2010/030338, International Search Report & Written Opinion, Jun. 3, 2010.

International Application No. PCT/US2010/032668, International Search Report and Written Opinion, Jul. 1, 2010.

International Application No. PCT/US2010/036940, International Search Report and Written Opinion, Jul. 21, 2010.

International Application No. PCT/US2010/037816, International Search Report and Written Opinion, Aug. 5, 2010.

International Application No. PCT/US2010/042703, International Search Report and Written Opinion, Sep. 13, 2010.

International Application No. PCT/US2010/046266, International Search Report and Written Opinion, Oct. 20, 2010.

International Application No. PCT/US2010/057472, International Search Report and Written Opinion, Jan. 18, 2011.

International Application No. PCT/US2010/059295, International Search Report and Written Opinion, Feb. 1, 2011.

International Application No. PCT/US2010/059466, International Search Report and Written Opinion, Feb. 1, 2011.

International Application No. PCT/US2011/022419, International Search Report and Written Opinion, Mar. 29, 2011.

International Application No. PCT/US2011/022426, International Search Report and Written Opinion, Mar. 28, 2011.

Mobilians Co. Ltd., company website located at http://www.mobilians.co.kr/english/, available at least by Jan. 12, 2009.

PayPal, Inc., "Get What You Want, When You Want It," located at https://www.paypal.com/cgi-bin/webscr?cmd=xpt/Marketing/mobile/MobileBuyStuff-outside, available at least by Mar. 5, 2009.

PayPal, Inc., "Texting with PayPal—Easy as Lifting a Finger," located at https://www.paypal.com/cgi-bin/webscr?cmd=xpt/Marketing/mobile/MobileAdvancedFeatures-outside, available at least by Mar. 5, 2009.

Squidoo, LLC, "Introducing MobillCash: Make a Secure Sale Even When an Online Customer Has No Cash, Credit Cards or I.D.," located at http://www.squidoo.com/mobillcash-pay-by-mobile-phone, available at least by Aug. 29, 2008.

Sun Microsystems Inc., "The Road to Mobile Banking," white paper, Jun. 2008.

Tindal, Suzanne, "St. George Counts Down to Two-Factor Authentication," ZDNet Australia, Feb. 19, 2008.

Trusted Mobile Payment Framework, "Scheme Rules," version 2.0, Aug. 6, 2008.

VISUALtron Software Corporation, "2-Factor Authentication—What is MobileKey?" located at http://www.visualtron.com/products_mobilekey.htm, available at least by 2008.

Wikimedia Foundation, Inc., "Authentication," located at en.wikipedia.org/wiki/Authentication, Mar. 17, 2009.

Wikimedia Foundation, Inc., "Credit Card," located at en/wikipedia.org/wiki/Credit_card, Dec. 5, 2008.

Wikimedia Foundation, Inc., "Security Token," located at en.wikipedia.org/wiki/Security_token, Apr. 13, 2009.

Wikimedia Foundation, Inc., "Two-Factor Authentication," located at en.wikipedia.org/wiki/Two-factor_authentication, Apr. 24, 2009.

Zabawskyj, Bohdan, "In the Media: The Mobile Money Opportunity," Billing World and OSS Today, located at http://www.redknee.com/news_events/in_the_media/43/?PHPSESSID=1e0ca1ab057bf9dc2c88104877ca8010, Sep. 2007.

European Patent Application No. 09711520.8, Extended Search Report mailed Apr. 27, 2011.

International Application No. PCT/US2010/050616, International Search Report and Written Opinion, Apr. 26, 2011.

International Application No. PCT/US2011/30039, International Search Report and Written Opinion, May 23, 2011.

International Application No. PCT/US2011/30038, International Search Report and Written Opinion, May 25, 2011.

Onebip S.R.L , "OneBip—to Pay Online with Your Mobile Phone", Youtube online video at http://www.youtube.com/watch?v=RiEsMccOtJY, May 23, 2007.

Arrington, Michael , "Mobile Payments Getting Traction on Social Networks but Fees are Sky High", Tech Crunch, located a http://techcrunch.com/2009/01/13mobile-payments-getting-traction-on-social-networks-but-fees-are-sky-high/,, Jan. 13, 2009.

Brooks, Rod , "MobilCash:Worlds First in Mobile Payments", YouTube online video located at http://youtube.com/wacth?v=j6Xv35gSmbg,, Oct. 12, 2007.

Bruene, Jim , "PayPal Launches on Facebook: Who Wants to be the First Bank?", located at http://www.netbanker.com/2007/06paypal_launches_on_facebook_who_wants_to_be_the_first_bank_on_facebook.hml,, Jun. 22, 2007.

Chen, Will , "Gift Shop Credits Have Arrived", The Facebook Blog, located at gttp://blog.facebook.com/blog.php?post=36577782130, Oct. 31, 2008.

Federal Trade Commission "Children's Online Privacy Protection Act (COPPA)", 15 U.S.C. §§ 6501-6506, Oct. 21, 1998.

Ihlwan, Moon , "In Korea, Cell Phones Get a New Charge", http://businessweek.com/globalbiz/content/mar2006/gb20060301_260288.htm, Mar. 1, 2006.

Lee, Jessica , "Payment Industry Perspectives: Q&A with Zong CEO David Marcus", http://www.insidefacebook.com/2009/05/19payment-industry-perspectives-qa-with-zong-ceo-david-marcus/, May 19, 2009.

Nicole, Kirsten , "Pay me Lets You Send and Receive Money Through Facebook", http://mashable.com/2007/06/17pay-me-facebook-app, Jun. 17, 2007.

Zong, Inc., , "Virtual Goods/Currency and Mobile Payments: The Business Model for Social Apps", The Zong Blog at http://blog-zong.com/2008/10/25/virtual-goods-currency-and-mobile-payments-the-business-model-for-social-apps/, Oct. 28, 2008.

Zong, Inc. "Zong Mobile Payment Demo on a Facebook App", You Tube online video at http://www.youtube.com/watch?v=aLjRcAFrGil, Jan. 5, 2009.

Zong, Inc., , "Zong-Mobile Payments for Your Web App", You tube online video at http://www.youtube.com/watch?v=O2C3SQraAvQ, Sep. 5, 2008.

Zong, Inc. "Zong Mobile Payments in Smallworlds", You Tube online video at htttp://www.youtube.com/watch?v=Y6CEw3tSgBc, Feb. 10, 2009.

* cited by examiner

SYSTEMS AND METHODS TO PROCESS TRANSACTION REQUESTS

CROSS-REFERENCE TO RELATED APPLICATIONS

This is a continuation of prior U.S. patent application Ser. No. 12/478,725, filed on Jun. 4, 2009, which claims priority from U.S. Provisional Patent Application No. 61/170,953, filed Apr. 20, 2009 and entitled "Systems and Methods to Process Transactions Requests," each of which are incorporated herein by reference in their entirety.

FIELD OF THE TECHNOLOGY

At least some embodiments of the disclosure relate to mobile communications in general and, more particularly but not limited to, mobile communications to facilitate online transactions.

BACKGROUND

Short Message Service (SMS) is a communications protocol that allows the interchange of short text messages between mobile telephone devices. SMS messages are typically sent via a Short Message Service Center (SMSC) of a mobile carrier, which uses a store-and-forward mechanism to deliver the messages. When a mobile telephone is not reachable immediately for the delivery of the message, the SMSC stores the message for later retry.

SMS messages can be sent via gateways. Some gateways function as aggregators. An aggregator typically does not have the capacity to deliver the messages directly to the mobile phones. An aggregator typically interfaces with and relies upon the SMSC of a mobile carrier to deliver SMS messages.

Some gateways function as providers that are capable of sending text messages to mobile devices directly, without going through the SMSC of other mobile operators.

Text messaging between mobile telephones can also be performed using other protocols, such as SkyMail and Short Mail in Japan.

Some mobile carriers provide email gateway services to allow text messages to be sent to mobile phones via email. For example, a non-subscriber of the mobile carrier may send a message to an email address associated with a mobile phone of a subscriber of the mobile carrier to have the message delivered to the mobile phone via text messaging.

Emails can also be sent to mobile telephone devices via standard mail protocols, such as Simple Mail Transfer Protocol (SMTP) over Internet Protocol Suite (commonly TCP/IP, named from two of the protocols: the Transmission Control Protocol (TCP) and the Internet Protocol (IP)).

Short messages may be used to provide premium services to mobile phones, such as news alerts, ring tones, etc. The premium content providers may send the messages to the SMSC of the mobile operator using a TCP/IP protocol, such as Short Message Peer-to-peer Protocol (SMPP) or Hypertext Transfer Protocol, for delivery to a mobile phone; and the mobile phone is billed by the mobile operator for the cost of receiving the premium content.

Premium services may also be delivered via text messages initiated from the mobile phone. For example, a televoting service provider may obtain a short code to receive text messages from mobile phones; and when the user sends a text message to the short code, the mobile carrier routes the message to the televoting service provider and charges the user a fee, a portion of which is collected for the televoting service provider.

SUMMARY OF THE DESCRIPTION

Systems and methods are provided to facilitate on-site processing of transaction requests. Some embodiments are summarized in this section.

In one aspect, a system includes a data storage facility to store an account identifier of a user and a phone number of the user and an interchange coupled with the data storage facility. The interchange includes a common format processor and a plurality of converters to interface with a plurality of different controllers of mobile communications. The converters are configured to communicate with the controllers in different formats.

In one embodiment, the converters are further configured to communicate with the common format processor in a common format to transmit a message to a telephone at the telephone number of the user to prompt the user to confirm a request and to receive a confirmation of the request via the telephone. The request is received via a user interface embedded in a web page of a first website that is separate from a web server of the interchange and received in the web server from the user interface without causing the web page of the first website to be reloaded. The interchange may use the account identifier to process the payment to the first website, or send premium messages to the telephone at the telephone number to collect funds for the payment via the telecommunication carrier.

In another aspect, a computer-implemented method includes: presenting a user interface within a web page of a first website to receive a phone number from a user of the web page; receiving the phone number in a second website via the user interface presented within the web page of the first website; communicating with a mobile phone at the phone number received via the user interface to obtain a confirmation of a transaction indicated in the web page of the first website; in response to the confirmation, communicating with the mobile phone to collect funds for the transaction via a telecommunication carrier of the mobile phone; and presenting in the user interface an indication of the confirmation without the web page being reloaded.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, an interchange is used to interface with a plurality of different controllers of mobile communications, such as SMS messages. The interchange can be used to associate account information with phone numbers to facilitate electronic payments via mobile devices, such as cellular phones. The interchange is configured to communicate with the mobile phones through the different controllers to provide security and convenience for online transactions.

Figure 1:
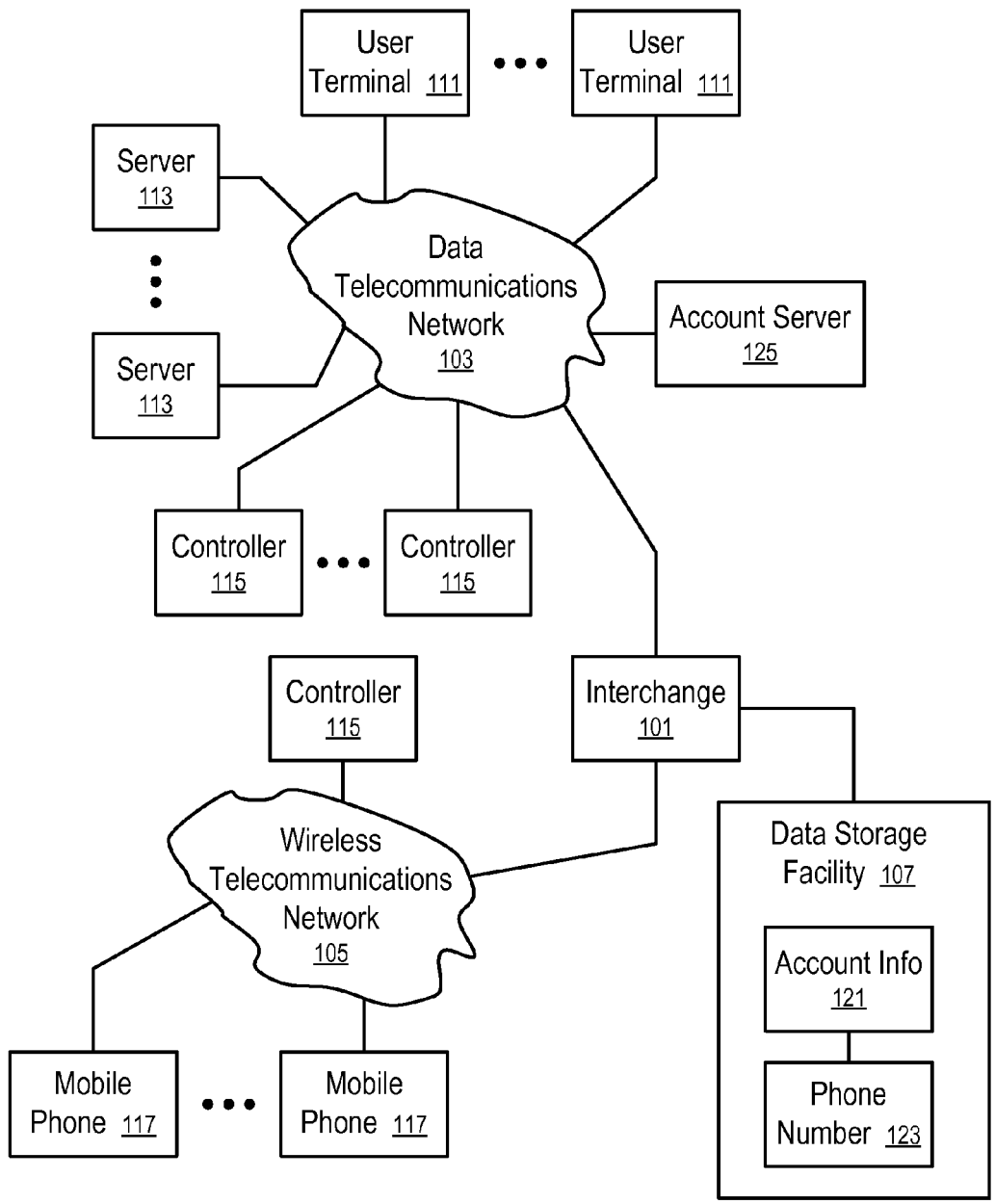
FIG. 1 shows a system to facilitate online transactions according to one embodiment.

FIG. 1 shows a system to facilitate online transactions according to one embodiment. In FIG. 1, an interchange (101) is provided to interface with a plurality of different controllers (115) for communications with the mobile phones (117) over the wireless telecommunications network (105).

In FIG. 1, a data storage facility (107) stores user account information (121) and the corresponding phone numbers (123) of the mobile phones (117). The interchange (101) is coupled with the data storage facility (107) to communicate with the mobile phones (117) at the corresponding phone numbers (123) to confirm operations that are performed using the account information (121). Since the account information (121) is secured by the interchange (101), the account information (121) can be used to pay for products and services offered by the servers (113) of various merchants, without being revealed to the merchants.

In one embodiment, the server (113) offers products and/or services adapted for a virtual world environment, such as an online game environment, a virtual reality environment, etc. The products may be virtual goods, which can be delivered via the transmission of data or information (without having to physically deliver an object to the user). For example, the virtual goods may be a song, a piece of music, a video clip, an article, a computer program, a decorative item for an avatar, a piece of virtual land in a virtual world, a virtual object in a virtual reality world, etc. For example, an online game environment hosted on a server (113) may sell services and products via points or virtual currency, which may be consumed by the user while engaging in a game session. For example, a virtual reality world hosted on a server (113) may have a virtual currency, which may be used by the residents of the virtual reality world to conduct virtual commerce within the virtual reality world (e.g., buy virtual lands, virtual stocks, virtual objects, services provided in the virtual reality world, etc). In other embodiments, the server (113) may also offer physical goods, such as books, compact discs, photo prints, postcards, etc.

In FIG. 1, the interchange (101) may communicate with different controllers (115) of mobile communications via different networks (e.g., 105 and 103) and/or protocols. The interchange (101) processes the requests in a common format and uses a set of converters for communications with the different controllers (115) respectively.

For example, the controllers (115) may be different aggregators, providers and/or SMSCs of different mobile carriers. Based on the phone numbers (123), the interchange (101) interfaces with the corresponding controllers (115) to communicate with the mobile phones (117) via text messaging to confirm the operations related to the corresponding account information (121), such as bank accounts, credit card numbers, charge card numbers, etc.

In FIG. 1, the user terminals (111) may use a unified interface to send requests to the interchange (101). For example, a web site of the interchange (101) may be used to receive the account information (121) from the web browsers running in the user terminals (111). The user terminals (111) are typically different from the mobile phones (117). However, in some embodiments, users may use the mobile phone (117) to access the web and submit the account information (121). Alternatively, the users may use the mobile phone (117) to submit the account information (121) to the interchange (101) via text messaging, email, instant messaging, etc.

The use of the mobile phones (117) in the confirmation of activities that involve the account information (121) increases the security of the transaction, since the mobile phones (117) are typically secured in the possession of the users.

Further, in one embodiment, the interchange (101) may use the phone bills of the mobile phones (117) to pay for purchases, in order to use the account information (121) to pay for the phone bills, and/or to deposit funds into the accounts identified by the account information (121) by charging on the phone bills of the corresponding mobile phones (117). In some embodiments, the accounts identified by the account information (121) are hosted on the data storage facility (107). In other embodiments, the accounts are hosted on the account servers (125) of financial institutions, such as banks, credit unions, credit card companies, etc.

In one embodiment, once the account information (121) is associated with the mobile phones (117) via their phone numbers (123) stored in the data storage facility (107), the users may use the user terminals (111) to access online servers (113) of various merchants or service providers to make purchases. From the user terminals (111), the users can use the accounts identified by the account information (121) to make the payment for the purchases, without revealing their account information (121) to the operators of the servers (113).

In one embodiment, the mobile phones (117) are used by the corresponding users to make payments and/or manage funds, such as for making purchases in various websites hosted on the servers (113) of merchants and service providers and/or for transferring funds to or from an account identified by the account information (121), such as phone bills of land-line telephone services, credit card accounts, debit card accounts, bank accounts, etc., or an account hosted on the data storage facility (107) or telecommunication accounts of the mobile phones (117) with telecommunication carriers. The mobile phones (117) are used to confirm and/or approve the transactions associated with the account identified by the account information (121) (or other accounts). The interchange (101) interfaces the mobile phones (117) and the servers (113) to confirm and/or approve transactions and to operate on the account identified by the account information (121) (and/or other accounts associated with the phone number (123)).

For example, the user terminal (111) may provide the phone numbers (123) to the servers (113) to allow the servers (113) to charge the account identified by the account information (121) associated with the phone number (123). The interchange (101) sends a message to the mobile phone (117) via the phone number (123) to confirm the payment request. Once the payment is confirmed or approved via the corresponding mobile phone (117), the interchange (101) charges the account identified by the account information (121) (e.g., by communicating with the account server (125) on which the corresponding accounts are hosted) and pays the server (113) on behalf of the user, using the funds obtained from the corresponding account identified by the account information (121).

In one embodiment, the user terminal (111) may not even provide the phone number (123) to the server (113) to process the payment. The server (113) may redirect a payment request to the interchange (101), which then prompts the user terminal (111) to provide the phone number (123) to the web site of the interchange (101) to continue the payment process.

For example, the server (113) may redirect the payment request to the web site of the interchange (101) with a reference indicating the purchase made via the user terminal (111). The interchange (101) can use the reference to subsequently complete the payment with the server (113) for the purchase, after receiving the phone number (123) directly from the user terminal (111) to confirm the payment via the mobile phone (117).

In some embodiments, instead of directly providing the phone number (123) to identify the account information (121), the user may provide other information to identify the phone number (123), such as an account identifier of the user assigned to the user for obtaining the services of the interchange (101).

In one embodiment, the account information (121) is pre-associated with the phone number (123) prior to the payment request. The account information (121) may be submitted to the interchange (101) via the user terminal (111) or the mobile phone (117) via a secure connection.

Alternatively, the user may supply the account information (121) to the interchange (101) at the time the payment request is submitted from the user terminal (111) to the interchange (101). Alternatively, the user may supply the account information (121) to the interchange (101) at the time the user responds to the confirmation message for the payment request.

In some embodiments, the user may supply the account information (121) after a transaction using funds collected via the telecommunication carrier of the mobile phone (117) at the phone number (123). For example, after the transaction, the interchange (101) may send an invitation message, such as a text message to the mobile phone (117) at the phone number (123), to the user to invite the user to register with the interchange (101) and provide the account information (121). The user may register with the interchange (101) via the mobile phone (117) (e.g., by a replying text message), or via a web page of the interchange (101) (e.g., using a link and/or a unique code provided in the invitation message).

After the user registers with the interchange (101) (e.g., via the mobile phone (117) and by providing the account information (121)), the user may create a customized personal identification number (PIN) or receive a PIN for enhanced security. Using the PIN, the user may use the account information (121) to complete an online transaction without having to confirm and/or approve a transaction using the mobile phone (117). In some embodiments, the PIN may be used to reduce unwanted messages to the mobile phone (117). For example, once the phone number (123) and the account information (121) are associated with a PIN, the interchange (101) may require the user of the user terminal (111) to provide the correct PIN to initiate the payment process. Thus, a spammer having only the phone number (123) (or a different user mistakenly using the phone number (123)) may not successfully use the user terminal (111) to request the interchange (101) to send confirmation messages to the mobile phone (117) protected by the PIN. In some embodiments, the interchange (101) may offer further incentives to the user for registering with the interchange (101), such as reduced fees, discounts, coupons, free products and services, etc.

In one embodiment, once the account information (121) is associated with the phone number (123) in the data storage facility (107), the user does not have to resubmit the account information (121) in subsequent payment requests.

By delegating the payment task to the interchange (101) and securing the account information (121) in the data storage facility (107), the system as shown in FIG. 1 can increase the security of using the account information (121) in an online environment.

In some embodiments, the interchange (101) can also fulfill the payment requests using the funds collected via the phone bill of the phone numbers (123). The interchange (101) can collect the funds via sending premium messages to the mobile phones (117) at the phone numbers (123), after receiving confirmation from the mobile phone (117).

For example, after the confirmation or approval message is received from the mobile phone (117), the interchange (101) performs operations to collect funds via the phone bill of the phone number (123). The interchange (101) may calculate the required premium messages to bill to the mobile phone (117). For example, mobile terminated premium SMS messages may have a predetermined set of prices for premium messages. The interchange (101) determines a combination of the premium messages that has a price closest to the amount required by the transaction, and sends this combination of premium messages to the mobile phone (117). For example, mobile originated premium SMS messages may also have a predetermined set of prices for premium messages. The interchange (101) can calculate the set of messages required for the transaction and transmit a text message to the mobile phone (117) of the user to instruct the user to send the required number of premium messages to provide the funds.

Figure 2:
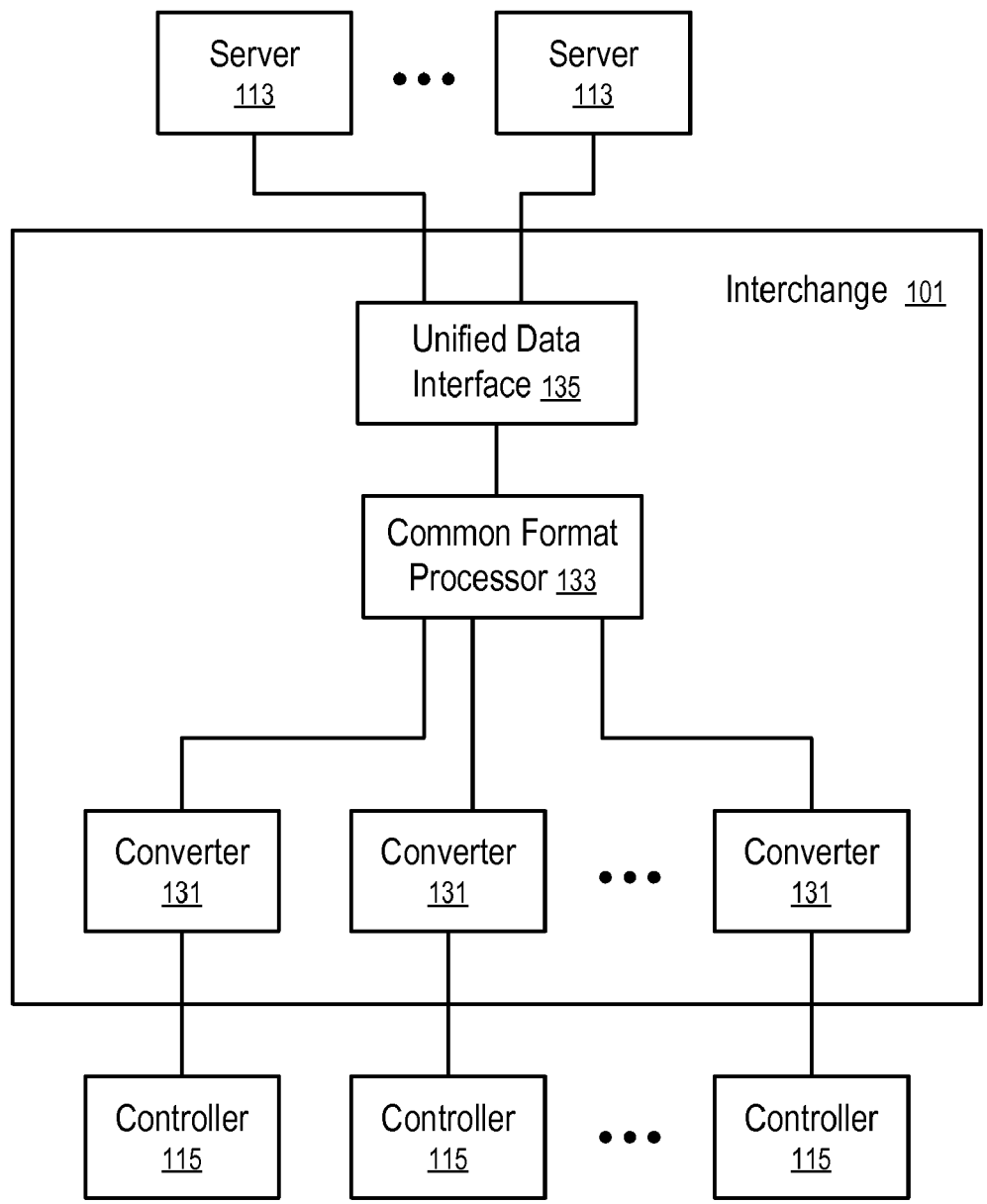
FIG. 2 shows an interchange to route messages according to one embodiment.

FIG. 2 shows an interchange to route messages according to one embodiment. In FIG. 2, the interchange (101) includes a unified data interface (135) for interaction with the servers (113). The servers (113) may redirect the payment requests to the interchange (101) to allow the interchange (101) to subsequently communicate with the user to process the payment request, including obtaining payment options and identifying user accounts, before returning to communicating with the server (113). Alternatively, the servers (113) may collect account related information (e.g., the phone number of the user) to request payment from the interchange (101).

In FIG. 2, the interchange (101) includes a common format processor (133), which processes various payment options in a common format. In one embodiment, the common format processor (133) can handle the payments via mobile terminated text message, mobile originated text message, operator bill, credit card, stored value account, and other online payment options. The common format processor (133) determines the actual amount that is to be billed to the user, based on the payment options (e.g., mobile terminated premium SMS, mobile originated premium SMS, operator billing, credit cards, etc.), and selects a converter (131) to communicate with a corresponding controller (115).

Different converters (131) are configured to communicate with corresponding controllers (115) in different languages and protocols. The converters (131) perform the translation between the common format used by the common format processor (133) and the corresponding formats used by the controllers (115).

The use of the common format processor (133) simplifies the structure of the interchange (101) and reduces the development effort required for the interchange (101) to interface with the increasing number of different controllers, such as SMSC, mobile providers, aggregators, gateways, etc.

Figure 3:
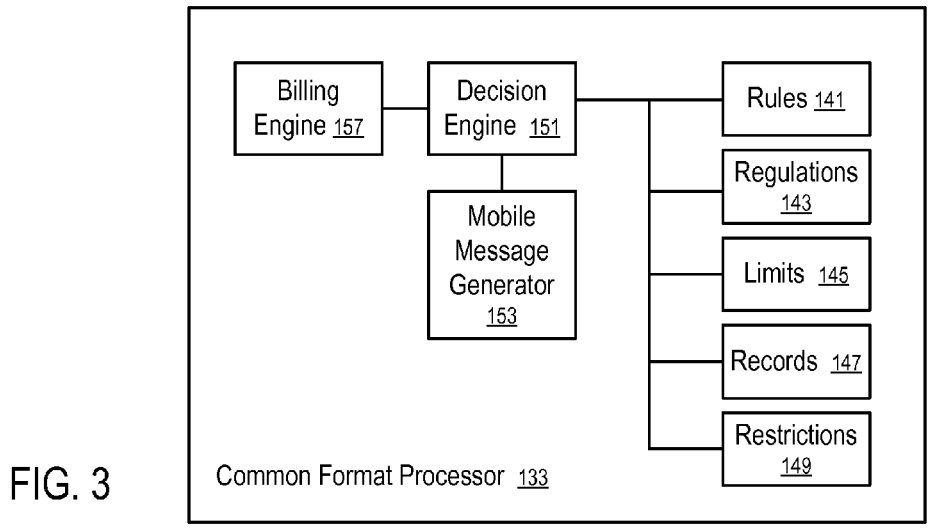
FIG. 3 shows a message processor according to one embodiment.

FIG. 3 shows a message processor according to one embodiment. In FIG. 3, the common format processor (133) includes a billing engine (157) that calculates the amount to be billed to the user, by adding or subtracting transaction costs for different billing methods, such as mobile terminated text message, mobile originated text message, operator billing, credit card, stored value account, and other online payment options.

In one premium message billing method, the interchange (101) sends mobile terminated premium SMS messages to the mobile phone (117) to bill the user, or requests the mobile phone (117) to send mobile originated premium SMS messages to a short code representing the interchange (101).

In one operator billing method, the interchange (101) directly sends a message to the mobile carrier of the mobile phone (117) to bill the amount on the phone bill of the mobile phone (117), without having to send a premium message to the mobile phone (117).

The common format processor (133) includes a decision engine (151) which decides how to generate a set of one or more messages to the mobile phone (117) based on a set of rules (141), regulations (143), limits (145), records (147) and restrictions (149).

For example, different countries have different regulations (143) governing the mobile communications with the mobile phones (117). For example, different mobile carriers have different rules (141) regarding premium messages. For example, past transaction records (147) can be used to monitor the transactions to discover suspected fraudulent activities. For example, parental limits (145) and merchant restrictions (149) can be imposed.

Based on results of the decision engine (151), the mobile message generator (153) generates one or more messages to communicate with the mobile phone (117) about the transaction (e.g., a request to collect funds via the phone bill of the user for a payment request, or for deposit into an account identified by the account information (121)). The converter (131) then interfaces with the corresponding controller (115) to transmit the messages to the mobile phones (117).

Figure 4:
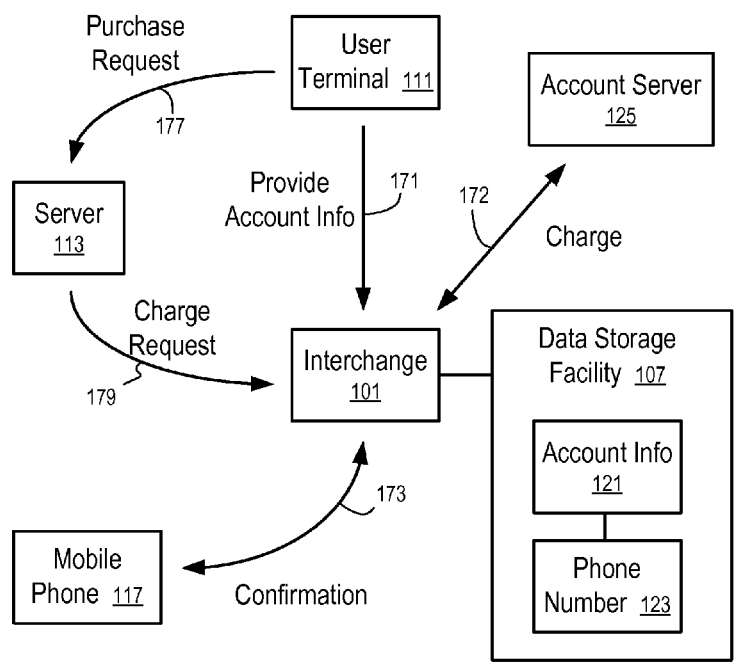
FIG. 4 shows a method to facilitate an online transaction using an interchange according to one embodiment.

FIG. 4 shows a method to facilitate an online transaction using an interchange according to one embodiment. In FIG. 4, the user terminal (111) provides (171) account information (121) to the interchange (101) for association with the phone number (123). For example, the user may use a device running a web browser as the user terminal (111) to submit the account information (121) via a secure web connection. The user terminal (111) is typically different from the mobile phone (117). However, in some embodiments, the mobile phone (117) may also be used as the user terminal (111) to submit the account information (121) (e.g., via a wireless application protocol (WAP) application, or via a message sent via short message service (SMS) or multimedia message service (MMS), or via an email message or an instant message).

After the user provides the account information (121) to the interchange (101) for storage in the data storage facility (107), the user can send (177) a charge request to the server (113) of a merchant from the user terminal (111). The server (113) of the merchant can send or redirect (179) the charge request to the interchange (101). In response to the charge request, the interchange (101) sends (173) a confirmation message to the mobile phone (117). If the user sends (173) an approval, or an appropriate reply, to the confirmation message from the mobile phone (117), the interchange (101) communicates with the account server (125) to charge an account of the user identified by the account information (121), without revealing the account information (121) to the server (113). The interchange (101) pays the merchant on behalf of the user using the funds collected via charging the account of the user. For example, the interchange (101) may use its own bank account to pay the merchant operating the server (113). Thus, the financial information of the user is not revealed to the merchant.

Upon the completion of the payment process, the interchange (101) can notify the user via the mobile phone (117) and/or the user terminal (111).

In some embodiments, the server (113) of the merchant redirects the charge request to allow the user terminal (111) to communicate with the interchange (101) to continue the payment process; and the user terminal (111) may provide (171) the account information (121) directly to the interchange (101) after the charge request is redirected.

In alternative embodiments, the user may provide the account information (121) from the mobile phone (117) together with the approval of the charge request.

In one embodiment, the interchange (101) communicates with the mobile phone (117) for the confirmation of the charge request via SMS messages. Alternatively, the confirmation and approval messages can be sent (173) via emails, instant messages, voice message, live calls from operators, etc.

In some embodiments, the user of the mobile phone (117) may choose to fulfill the charge request via the phone bill, instead of charging the account identified by the account information (121). Thus, after the confirmation, the interchange (101) sends the premium messages to the mobile phone (117) to collect funds via the phone bill of the mobile phone (117). In other embodiments, the interchange (101) may send an instruction with the confirmation message to the mobile phone (117) to instruct the user to send mobile originated premium messages to the interchange (101) to collect the funds via the phone bill of the mobile phone (117).

Figure 5:
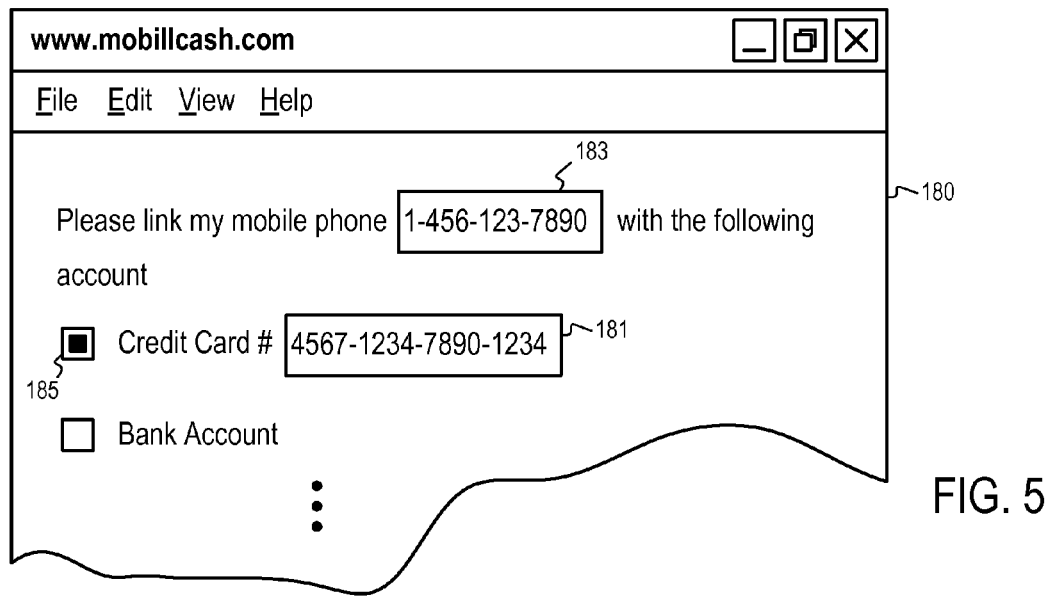
FIG. 5 illustrates a user interface to associate an account with a telephone number according to one embodiment.

FIG. 5 illustrates a user interface to associate an account with a telephone number according to one embodiment. In FIG. 5, the user interface (180) includes a text field (183) that allows the user to specify the phone number (123) with which the account information (121) provided in the text field (181) is to be associated.

In FIG. 5, the user interface (180) further includes an option list, which allows the user to select various types of accounts, such as credit card accounts, bank accounts, charge card accounts, etc. In the example illustrated in FIG. 5, the checkbox (185) is selected to specify a credit card account.

In some embodiments, the user interface (180) may further present a text field (not shown in FIG. 5) to allow the user to specify an alias for the account information (121) supplied in the text input field (181). For enhanced security, the alias can be used for subsequent communications with the user without revealing the account information (121).

In FIG. 5, the user interface (180) may be presented via a web browser (or a custom application) to submit account information (121) in the text input field (181) from a user terminal (111) to the interchange (101). Alternatively, the account number can be submitted from the mobile phone (117) via a message sent via SMS, WAP, voice mail, or via an interactive voice response (IVR) system.

Figure 6:
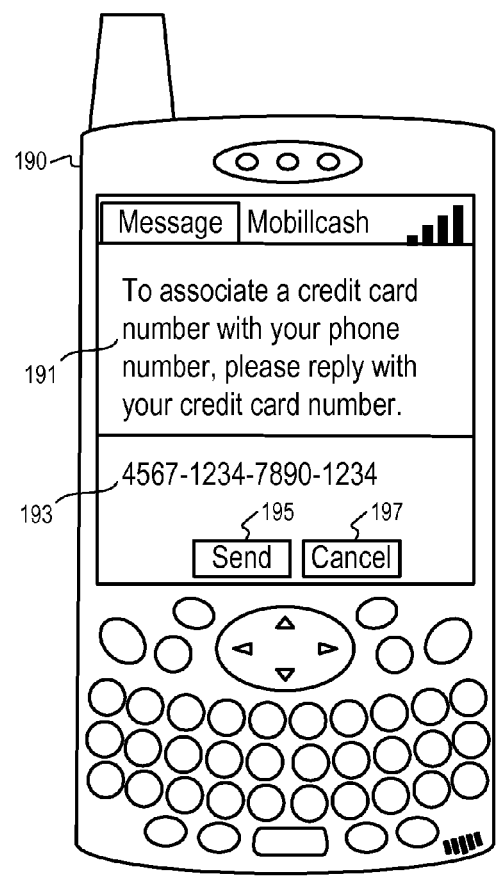
FIG. 6 illustrates another user interface to associate an account with a telephone number according to one embodiment.

FIG. 6 illustrates another user interface to associate an account with a telephone number according to one embodiment. In FIG. 6, the user interface (190) is presented on the mobile phone (117) of the user. The user interface (190) presents a message (191) from the interchange (101) to the mobile phone (117) at the phone number (123). The message (191) prompts the user to submit the account information (121) by providing a reply message (193). The user may select the "send" button (195) to provide the account information (121) for association with the phone number (123) or select the "cancel" button (197) to ignore the prompt.

In one embodiment, the messages (191 and 193) are transmitted to the mobile phone (117) via a short message service (SMS). Alternatively, the messages can be transmitted to the mobile phone (117) via other protocols, such as multimedia message service (MMS), email, instant messaging, WAP, voice mail, voice messages via an interactive voice response (IVR) system, etc.

Figure 7:
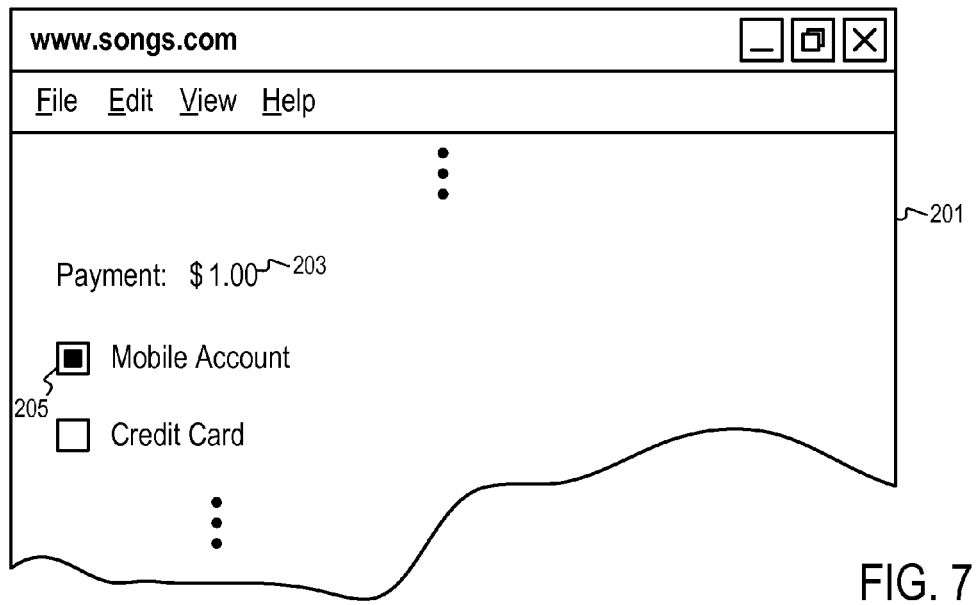
FIG. 7 illustrates a user interface to initiate a payment transaction according to one embodiment.

FIG. 7 illustrates a user interface to initiate a payment transaction according to one embodiment. In FIG. 7, the user interface (201) provides an option (205) to request the interchange (101) to process the payment for the amount (203) required to make a purchase from the server (113) of a merchant.

In one embodiment, after the user selects the payment option (205), the server (113) directs the request to the web server of the interchange (101), with a set of parameters to indicate the amount (203), the identity of the merchant, a reference to the purchase, etc. Thus, the user does not have to provide any personal information to the server (113) of the merchant to complete the payment process.

Alternatively, the user may provide the phone number to the merchant to process the payment. Thus, the user does not have to visit the web site of the interchange (101) to complete the payment.

In one embodiment, the server (113) presents the payment option (205) via an online shopping cart system or a third party checkout system. Alternatively or in combination, the server (113) presents the payment option (205) via a web widget. For example, a web widget may include a program code that is portable and executable within a web page without requiring additional compilation. The web widget allows the user to select the option (205) to pay for the product and/or service without leaving the web page or refreshing the web page. In one embodiment, the interchange (101) provides the web widget to facilitate the payment processing.

Figure 8:
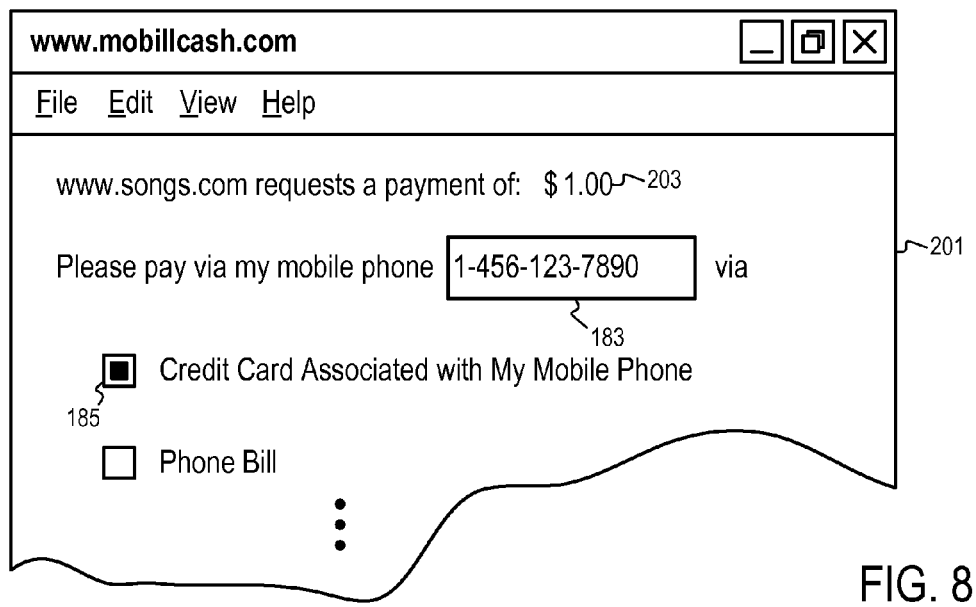
FIG. 8 illustrates a user interface to initiate a payment request according to one embodiment.

FIG. 8 illustrates a user interface to initiate a payment request according to one embodiment, after the payment request is redirected to the web site of the interchange (101). In FIG. 8, the user interface (201) includes the identity of the merchant and the amount (203) of the requested payment. The user interface (201) includes a text field (183) to allow the user to provide the phone number (123) to identify the account information (121) via its association with the phone number (123) in the data storage facility (107).

Further, user authentication may be used to reduce false messages to the phone number (123). For example, the user interface (201) may request a personal identification number (PIN) for enhanced security. For example, the user may be required to register with the interchange (101) prior to using the services of the interchange (101); and after registering with the interchange (101), the user is provided with the PIN or can create a customized PIN to access the functionality provided by the user interface (201).

Alternatively, the user interface (201) may request an identifier associated with the phone number (123) to initiate the payment transaction. In some embodiments, the user interface (201) requires the user to provide no information other than the phone number (123) in the text field (183) to initiate the transaction.

In FIG. 8, the user interface (201) allows the user to select one option from a plurality of payment options, including paying via the phone bill, and paying via one or more of the accounts identified by the account information (121) associated with the phone number (123) in the data storage facility (107).

In some embodiments, the user interface (201) may present the payment options after authenticating the user (e.g., via a personal identification number or password) for enhanced security.

In some embodiments, the user interface (201) identifies the different accounts represented by the account information (121) by showing aliases of the accounts. The aliases may be previously specified by the user, or be dynamically generated by the interchange (101) based on the types of the accounts and/or portions of the account information (121) (e.g., the first or last few digits of the account number, etc.)

In one embodiment, once the user submits the payment request via the user interface (201), the interchange (101) transmits a confirmation message to the mobile phone (117) according to the phone number (123) provided in the text field (183). In one embodiment, the interchange (101) transmits the confirmation to the mobile phone (117) after the user is authenticated via the user interface (201) to reduce the possibility of unauthorized/unwelcome messages to the mobile phone (117), which may occur when the user intentionally or unintentionally provides an unrelated phone number in the entry box (183).

Figure 9:
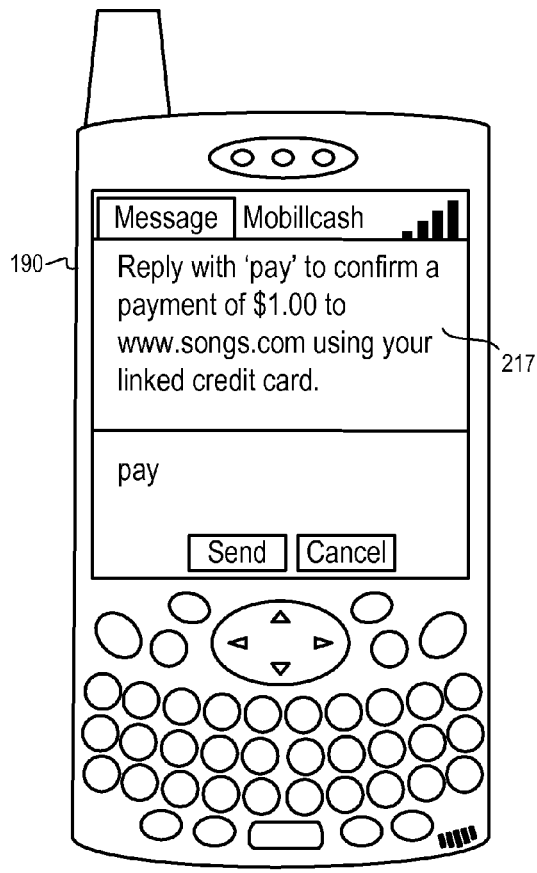
FIG. 9 illustrates a user interface to confirm a payment request according to one embodiment.

FIG. 9 illustrates a user interface to confirm a payment request according to one embodiment. In FIG. 9, the confirmation message (217) includes the amount (203) of the requested payment and the identity of the payee (e.g., a merchant operating the server (113)).

In one embodiment, the confirmation message (217) includes the instruction to reply with a code, such as a code (e.g., "pay") provided in the confirmation message (217) as illustrated in FIG. 9.

The presence of the code in the reply message is an indication of the user approving the request; and the requirement for such a code in the reply eliminates false confirmations (e.g., generated via accidental replies or automated replies).

Alternatively or in combination, the requested code may include a PIN associated with the account, and/or a code (not shown) randomly generated and presented in the user interface used to initiate the payment transaction (e.g., user interface (201)).

In some embodiments, the code requested in the text message (217) may be a PIN associated with the phone number (123). The text message (217) does not include the code; and the knowledge of the code is an indication of the identity of the user. Thus, the use of such a code increases the security of the transaction.

In a further embodiment, the code requested in the text message (217) includes a code that is provided in response to the payment request (e.g., via the user interface (201), not shown in FIG. 8). The code may be generated randomly at the time the request is received via the user interface (201), or when the user interface (201) is presented to the user. The code provided to the user interface (201) can be requested in the reply received from the user interface (190) to indicate that the user who is in possession of the mobile phone (117) has actual knowledge about the payment request submitted via the user interface (201).

After the correct reply is received, the interchange (101) communicates with the account server (125) to electronically charge the user using the account information (121) and pays the payee using the funds collected via communicating with the account server (125). The interchange (101) then notifies the user when the payment transaction is complete.

Figure 10:
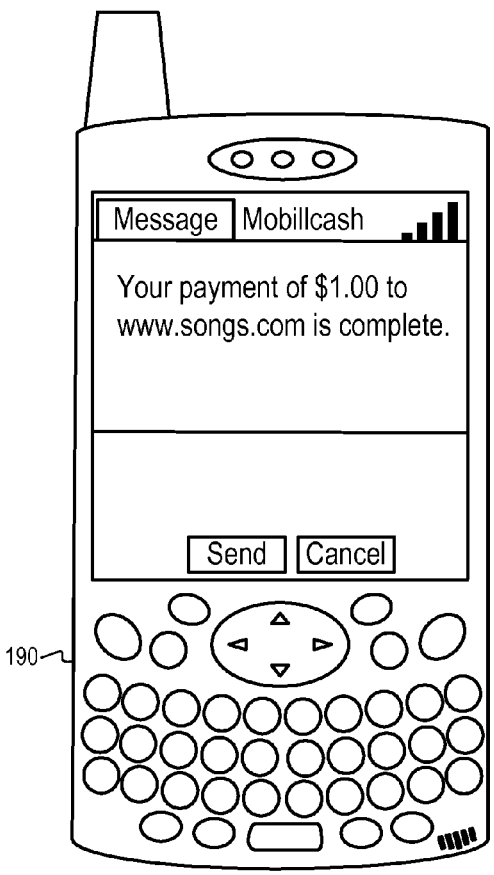
FIG. 10 illustrates a user interface to confirm the completion of a payment transaction according to one embodiment.

For example, the interchange (101) may notify the user via a text message to the mobile phone (117), as illustrated in FIG. 10. FIG. 10 illustrates a user interface to confirm the completion of a payment transaction according to one embodiment. No reply to the message that confirms the completion of the payment transaction is necessary. Once the payment transaction is complete, the user would have access to the product purchased via the payment transaction.

In one embodiment, the interchange (101) stores an address of the user associated with the phone number (123). After the completion of the payment transaction, the interchange (101) provides the address to the server (113) of the merchant for the delivery of the purchased product. In some embodiments, the user may provide multiple addresses associated with the phone number (123) and may select one as a delivery address in the confirmation/approve message to the interchange (101). Alternatively, the interchange (101) may receive an address for product delivery from the mobile phone (117) together with the confirmation/approve message and then forward the address to the server (113) of the merchant. Thus, the shipping address of the transaction is verified to be associated with the mobile phone (117). In alternative embodiments, the user may directly provide the shipping address in the website hosted on the server (113) of the merchant.

In other embodiments, the user is provided with the options to pay via the mobile phone bill associated with the phone number (123). The interchange (101) may dynamically calculate a set of premium messages, based on a set of limited number of predetermined prices for premium messages, to match the purchase price. The interchange (101) sends the set of premium messages to the mobile phone (117) at the phone number (123) to collect the funds via the telecommunication carriers to pay for the purchases. Thus, the purchase prices are not limited to the set of predetermined prices for premium messages. In some embodiments, the interchange (101) may send the set of premium messages in a period of time (e.g., a week, a month, a number of mouths, etc.) to spread the payments over the period of time (e.g., to overcome budget limits and/or limits imposed by regulations).

Figure 11:
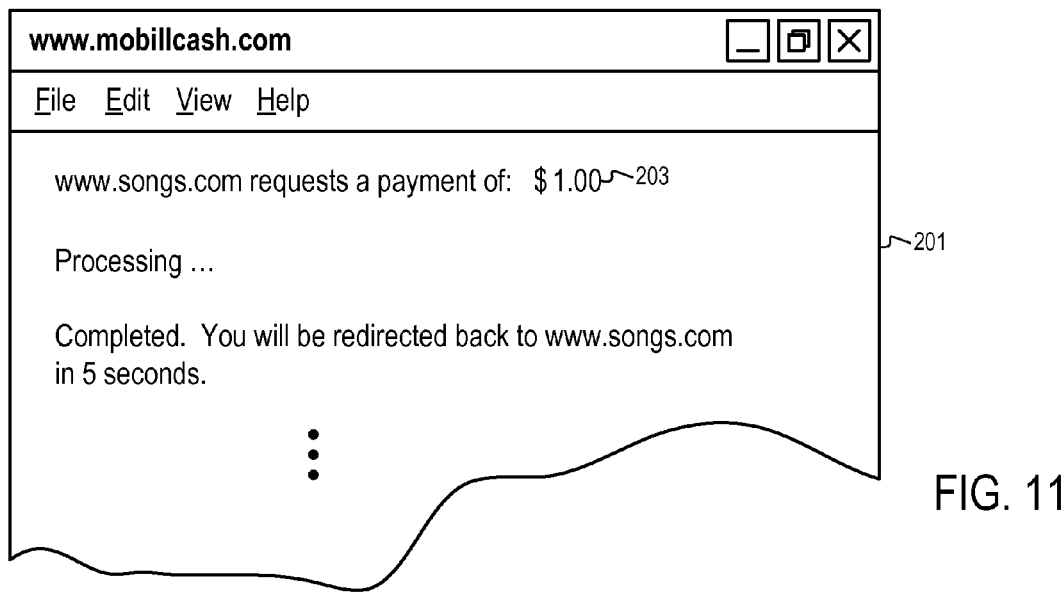
FIG. 11 illustrates a way to redirect a payment confirmation according to one embodiment.

FIG. 11 illustrates a way to redirect a payment confirmation according to one embodiment. For example, after the user submits the payment request to the interchange (101) via the user interface (201) shown in FIG. 8, the interchange (101) may present the user interface (201) illustrated in FIG. 11 to the user. The user interface (201) indicates that the request is being processed; and the user interface (201) is periodically updated to show progress. Once the payment transaction is completed, the user interface (201) provides a confirmation message and may automatically redirect the user back to the website of the payee (e.g., to access the purchased products or services).

In one embodiment, the user is required to provide the approval in response to the confirmation message (217), as illustrated in FIG. 9, within a predetermined period of time. If the user fails to provide the approval from the mobile phone (117) within the predetermined period of time, the payment request may be rejected; and the user interface (201) may present a message indicating the failure and then redirect the user back to the website of the payee.

In some embodiments, instead of redirecting the user back to the website of the payee after the expiration of a predetermined period of time (e.g., after the failure of the payment process, or after the completion of the payment), the user interface (201) may provide a link to the website of the payee to allow the user to manually select the link to go back to the website of the payee to continue the process at the website of the payee.

Figure 12:
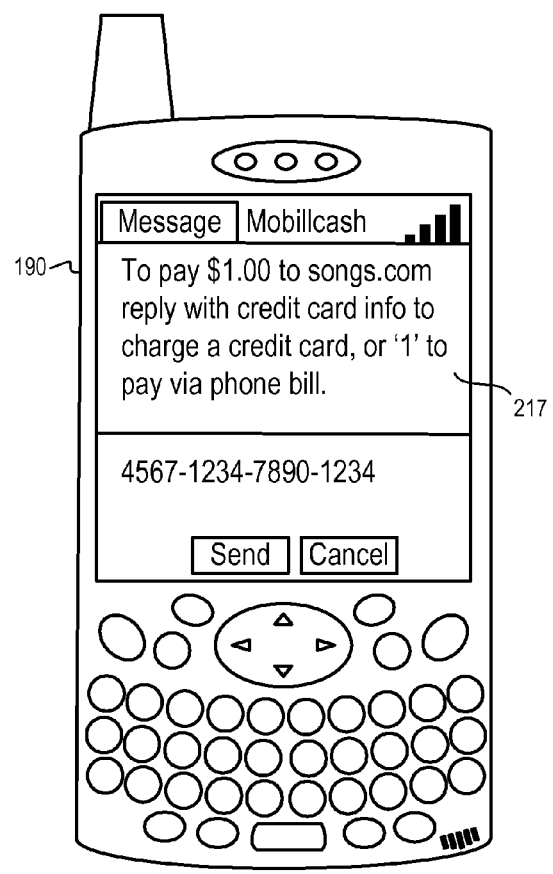
FIG. 12 illustrates a user interface to receive payment options according to one embodiment.

FIG. 12 illustrates a user interface to receive payment options according to one embodiment. In FIG. 12, the interchange (101) sends a message (217) to the mobile phone (117) to provide a number of options to the user. The message (217) identifies the amount (203) of the requested payment and the identity of the payee (e.g., a merchant operating the server (113)) and asks the user to approve the payment request via a reply that contains a selected payment option.

In FIG. 12, the user may reply with the code "1" to approve the payment request and to pay via the phone bill of the mobile phone (117). Alternatively, the user may reply with the credit card information to charge the payment to a credit card, as illustrated in FIG. 12.

In one embodiment, if the user provides credit card account information in the approval message, the credit card account information is stored and associated with the phone number (123) in the data storage facility (107). Thus, in subsequent approval messages, the user does not have to supply the same information again.

For example, the data storage facility (107) may store account information for each of a plurality of account types (e.g., Visa, MasterCard, checking, savings, etc.) Thus, each of the accounts can be identified to the user via the account type in the confirmation message, without revealing the details of the account information.

For example, the interchange (101) may combine the name of the financial institutions and the type of accounts to generate aliases for the account information.

In some embodiment, the user may define the aliases for the account information by supplying the aliases with the account information (121) for association with the phone number (123).

Figure 13:
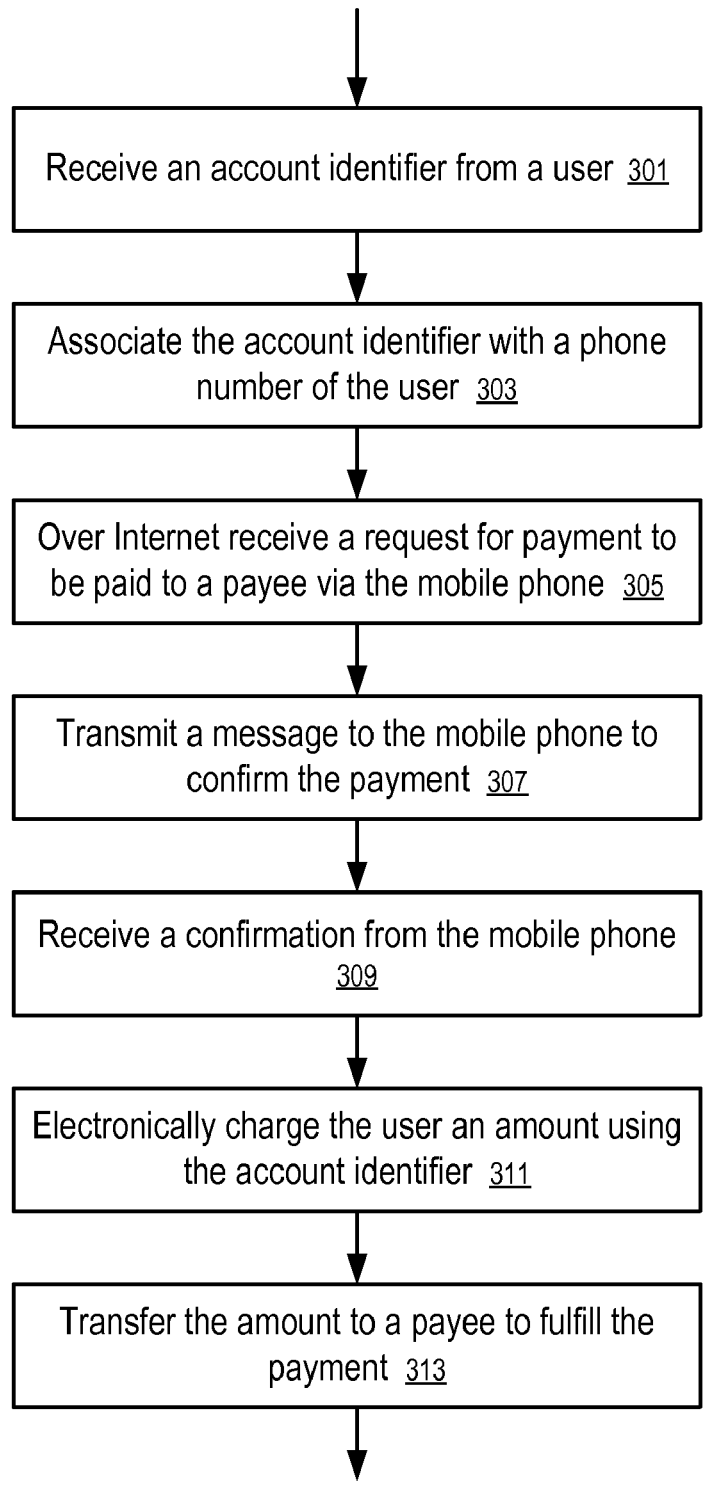
FIG. 13 shows a method to process an online payment according to one embodiment.

FIG. 13 shows a method to process an online payment according to one embodiment. In FIG. 13, the interchange (101) receives (301) an account identifier (e.g., 121) from a user and associates (303) the account identifier with a phone number (123) of the user in the data storage facility (107). Over the Internet the interchange (101) subsequently receives (305) a request for payment to be paid to a payee via the mobile phone (117) identified by the phone number (123). In response to the request, the interchange (101) transmits (307) a message (217) to the mobile phone (117) to confirm the payment.

After receiving (309) a confirmation or approval from the mobile phone (117) for the payment, the interchange (101) electronically charges (311) the user an amount using the account identifier (e.g., via communicating with the account server (125) using the account identifier). The interchange (101) then transfers (313) the amount to a payee to fulfill the payment.

Figure 14:
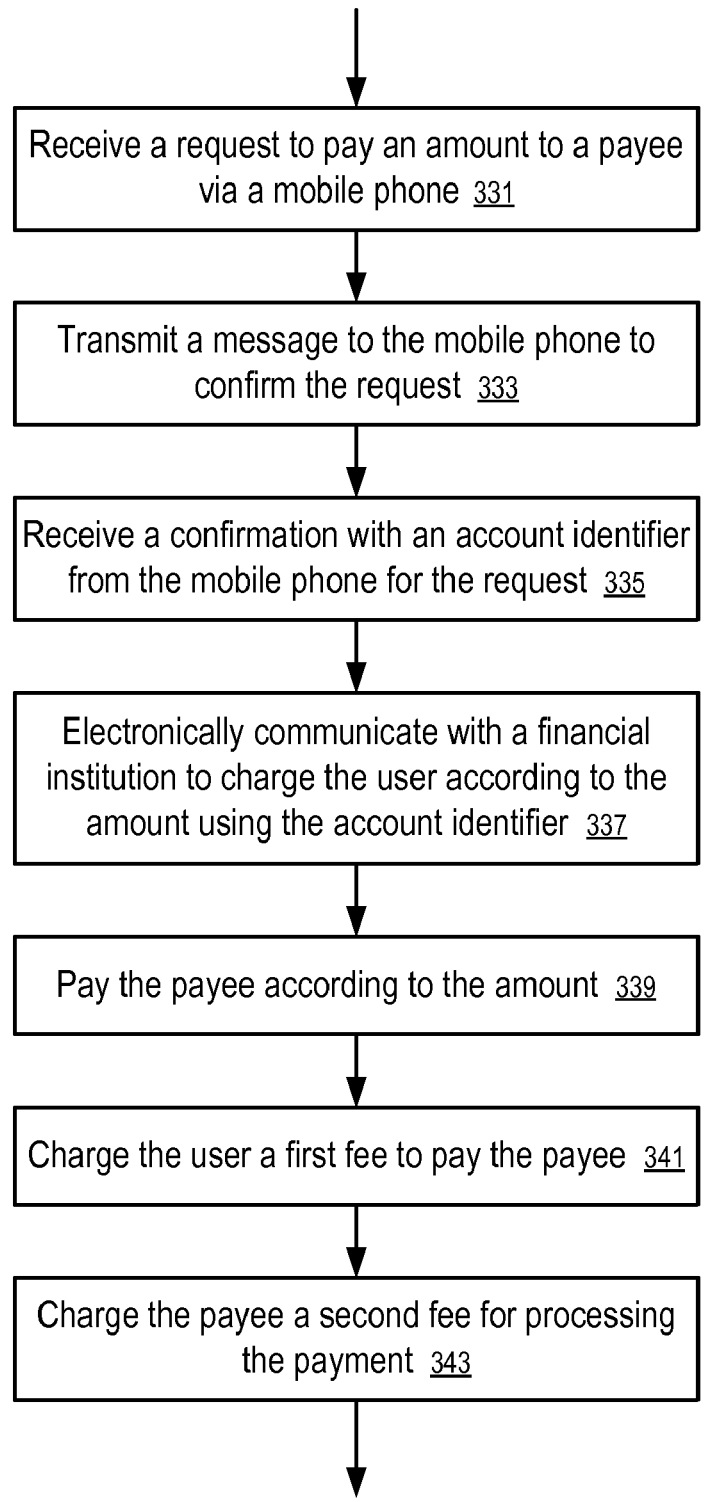
FIG. 14 shows another method to facilitate a payment transaction according to one embodiment.

FIG. 14 shows another method to facilitate a payment transaction according to one embodiment. In FIG. 14, the interchange (101) receives (331) a request to pay an amount to a payee via a mobile phone (117). The interchange (101) transmits (333) a message (217) to the mobile phone (117) to confirm the request via the converter (131) corresponding to the controller (115) of the mobile phone (117).

After the interchange (101) receives (335) a confirmation with an account identifier (e.g., 121) from the mobile phone (117) for the request, the interchange (101) electronically communicates (337) with a financial institution to charge the user the specified amount using the account identifier. The interchange (101) pays (339) the payee according to the amount, optionally charges (341) the user a first fee to pay the payee, and optionally charges (343) the payee a second fee for processing the payment.

In one embodiment, the users are given an incentive to provide the account information (121) for electronic payments via the account servers (125). For example, the interchange (101) may charge a lower fee for fulfilling payment requests via the account server (125) than for fulfilling payments requests via the phone bill. For example, the interchange (101) may offer rebates, discounts, etc. to the users who provide the account information (121). In some embodiments, the interchange (101) can complete a payment process via the account server (125) with less restrictions than via the phone bill.

In one embodiment, the merchant may specify the second fee. Different merchants may offer different percentages of the purchase prices as the second fee; and the interchange (101) may calculate the first fee based on the second fee offered by the merchant, by deducting the second fee from the total fees to be charged (e.g., fees charged by the telecommunication carrier for collecting the funds via the mobile phone bill associated with the telephone number (123) and/or the fees charged by the interchange (101) for processing the payments). Since the first fee is charged to the customer (e.g., the purchaser of products and services), the cost to the customer can vary based on the selection of the merchant. For the same purchase prices, the first fee (and thus the cost to the customer) may be different for purchases made via different merchants, because the merchants may offer different percentages of the purchase price as the second fee. In some embodiments, the first and second fees include both fees charged by the telecommunication carrier for collecting the funds via the mobile phone bill/account associated with the phone number (123) and the fees charged by the interchange (101) for processing the payments. In some embodiments, the first fee includes the fees charged by the telecommunication carrier but no fees charged by the interchange (101). In some embodiments, the second fee includes the fees charged by the telecommunication carrier but no fees charged by the interchange (101). In some embodiments, the first fee and/or the second fee do not include the fees charged by the telecommunication carrier. In some embodiments, the first fee is not charged; and in other embodiments, the second fee is not charged.

In one embodiment, the user interface for the communication between the user terminal (111) and the interchange (101) is presented within a web page of the server (113), such as on a website of a seller of a product or service. Thus, the user can perform the communication with the interchange (101) on the user terminal (111) without having to leave the website of the seller and/or refreshing a webpage on the website of the seller.

In one embodiment, Ajax is used to provide such a user interface within the web page of the seller. Ajax represents a group of related web development techniques used to create interactive web applications. One example of Ajax is AJAX (Asynchronous JavaScript and XML), which allows data content of a web page to be asynchronously loaded from a web server and allows the web application to communicate with the web sever in the background. For example, Ajax may use Extensible Hypertext Markup Language (XHTML) and Cascading Style Sheets (CSS) for presentation, the Document Object Model for dynamic display of and interaction with data, Extensible Markup Language (XML) and Extensible Stylesheet Language Transformations (XSLT) for the interchange, manipulation and display of data, the XMLHttpRequest (XHR) object for asynchronous communication, and JavaScript to combine the techniques via scripting. However, Ajax in general is not limited to such techniques. For example, other languages, such as VBScript may be used in place of JavaScript to perform client side scripting; and JavaScript Object Notation (JSON) can be used as an alternative format for data interchange. Other data formats, such as pre-formatted HTML or plain text, can also be used.

Figure 15:
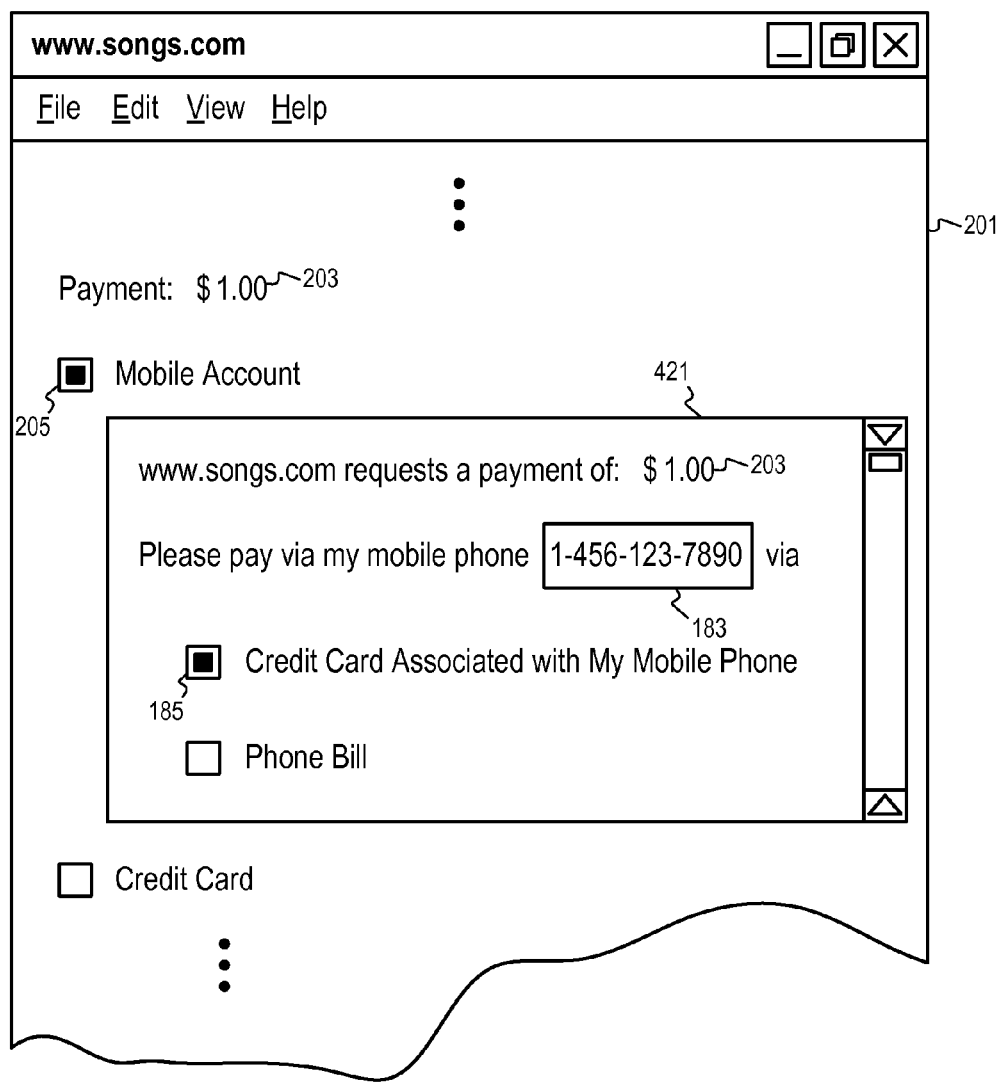
FIG. 15 shows a web page to process a payment transaction according to one embodiment.

FIG. 15 shows a web page to process a payment transaction according to one embodiment. In FIG. 15, when the browser window (201) presents a web page of the server (113) to process the purchase of a product (and/or a service), the web page may include a portion that presents a user interface (421) to communicate with the interchange (101).

In one embodiment, the user interface (421) allows the user to communicate with the interchange (101) in a way similar to the user interface illustrated in FIG. 8. For example, in FIG. 15, the user interface (421) presents the amount (203) for the payment and the identity of the payee (e.g., "www.songs.com" as illustrated in FIG. 15). For example, the user interface (421) allows the user to enter the phone number in the entry box (183) and select a payment option (e.g., via a selection box, such as a radio button (185), which allows the user to select one from a group of predetermined, mutually exclusive options). After the user submits the input within the user interface (421) (e.g., the phone number and the payment option), the user interface (421) is updated to report the current status of payment processing and/or to indicate the completion of the payment processing operations (e.g., reported in a way as illustrated in the user interface shown in FIG. 11).

In one embodiment, the user interface (421) is implemented using Ajax. Thus, the user can interact with the user interface (421) to provide input to the interchange (101) and receive updated information from the interchange (101) without having to refresh or reload the web page in the browser window (201) of FIG. 15.

In some embodiments, the user interface (421) may be updated multiple times, in response to the user inputs being communicated to the web server of the interchange (101). For example, the user interface (421) may be updated after the user confirms a summary of the transaction, using a link or an icon button (not shown) presented in the user interface (421). For example, the user interface (421) may be updated after the user confirms or specifies the phone number (123) in the entry box (183) in the user interface. For example, the user interface (421) may be updated after the user selects a payment option (185) associated with the phone number (123). For example, the user interface (421) may be updated after the user confirms the transaction via the mobile phone (117) at the phone number (123). For example, the user interface (421) may be updated after a code transmitted to the mobile phone (117) at the phone number (123) is received in the user interface (421). Thus, the interchange (101) may guide the user step by step to complete the confirmation process, without requiring a large display area to accommodate all the content at once.

In one embodiment, the user interface (421) may present a brief summary of the transaction. The brief summary may include the amount (203) of the transaction, the identity of the seller, a description of the product or service to be purchased (not shown), etc. In some embodiments, the user interface (421) may rely upon the web page presented in the browser window (201) to describe the transaction and/or the amount of the transaction. In some embodiments, the user interface (421) may simply request the user to confirm the amount (203).

After the user confirms the summary of the transaction, the user interface (421) may update the content displayed within the area of the user interface (421) to present payment options related to the mobile account. For example, the user interface (421) may remove the brief summary of the transaction and display the entry box (183) for the phone number of the user. The user may select an option to pay via the phone bill, or pay via a credit card associated with the phone number, or via a bank account, etc. In some embodiments, the user may further register one or more credit cards with the interchange (101).

In some embodiments, without the reloading or refreshing of the entire web page loaded in the window (201) of the browser, the user interface may communicate with the interchange (101) to authenticate the user. For example, the user may be required to submit a password or a personal identification number (PIN) to continue the payment process. In some embodiments, the PIN is associated with the phone number (123) on the data storage facility (107). The PIN may be generated by the interchange (101), or specified by the user, when the user registers with the interchange (101). In some embodiments, the PIN is associated with a service of a third party, such as a telecommunication carrier.

For example, the PIN used by the telecommunication carrier to control the access to the voice mails of the user may be used for the authentication of the user. The interchange (101) may communicate with the telecommunication carrier to verify whether a number received from the user is a correct PIN to access the voice mails of the phone number (123). Thus, the user does not have to separately register the PIN with the interchange (101).

In one embodiment, the user interface (421) may display a one time code and instruct the user to provide the code to the interchange (101) using the mobile phone (117) at the phone number (123) specified in the entry box (183).

In another embodiment, the user interface (421) may provide instructions to the user to provide to the user interface (421) a one time code that is transmitted for the transaction from the interchange (101) to the mobile phone (117) at the phone number (123).

In one embodiment, a one time code is valid for only one use in the confirmation of the transaction. The one time code may be associated with the transaction and/or set to expire after a predetermined period of time.

In one embodiment, the user interface (421) is inserted and/or expanded to display the content after the radio button (205) in the main body of the web page is selected for the option of making the payment via the mobile account of the user. If the radio button (205) is not selected, the user interface (421) is removed, or reduced in size, to improve visibility of other options. Alternatively, the user interface (421) can be presented without the radio button (205) being selected.

In one embodiment, the user interface (421) is presented via rendering a set of instructions downloaded from the interchange (101) when the web page is loaded in the browser window (201). The web page may include a reference to the interchange (101) to allow the browser to download the instructions at the time the instructions are needed for the rendering of the web page. Thus, the instructions for presenting the user interface (421) can be maintained at a centralized location at the interchange (101) for ease of maintenance, upgrade, and distribution.

In some embodiments, the web page provided by the server (113) includes information related to the transaction, such that when the user interface (421) is rendered in the browser window (201), the interchange (101) can obtain relevant information regarding the transaction, such as the amount of the transaction, a description of the product or service, an identity of the seller, etc.

For example, the web page may provide a transaction identifier to represent the transaction. The transaction identifier may be provided to the server (113) as part of the reference to the interchange (101) (e.g., as encoded in a uniform resource locator (URL) used to access the instructions), or as part of a parameter transmitted to the interchange (101) in response to the user activating a link or button presented in the user interface (421) (e.g., as a parameter passed to the script downloaded from the server (113)). The interchange (101) can use the transaction identifier to separately communicate with the server (113) to obtain further details about the transaction, such as the amount, a description of the item to be purchased, etc. In some embodiments, the details are transmitted from the web page to the interchange (101) in a way similar to the transmission of the transaction identifier, such that the interchange (101) does not have to initiate a separate, background communication with the server (113).

In one embodiment, the identity of the seller is determined by the interchange (101) via the referring URL of the request to access the user interface (421). Alternatively, the identity of the seller can be encoded within the transaction identifier.

In some embodiments, the user interface (421) is configured to include elements that communicate with the server (113) to allow the web page to provide progress and/or status indicators to the server (113). Thus, upon the completion of the communication between the user terminal (111) and the interchange (101), the interchange (101) may notify the server (113) via the web page.

In one embodiment, the interchange (101) confirms the transaction with the user via receiving a communication from the mobile phone (117) having the phone number (123) specified in the entry box (183). For example, the interchange (101) may be configured to receive a reply to a message sent to the mobile phone (117), or to receive a one time code provided in the user interface (421) presented on the user terminal (111).

In one embodiment, while the interchange (101) is waiting for the communication from the mobile phone (117) to confirm the transaction, the user interface (421) may periodically check with the web server of the interchange (101) for the status of the confirmation communication. If, when the user interface (421) checks for the status, the interchange (101) indicates that the communication from the mobile phone (117) has been received for the confirmation of the transaction, the user interface (421) may update the content of the user interface (421) to include a link or button (not shown) which can be used by the user to submit the purchase request to the web server (113).

Alternatively, the user interface (421) may indicate the successful confirmation of the transaction and instruct the user to continue the purchase process via a user element in the web page, such as a "submit" button in the web page. The user element is located outside the user interface (421) and is controlled by the scripts downloaded from the interchange. The "submit" button is configured to submit the purchase request to the sever (113) after the interchange (101) obtains payment information and/or finishes processing the payment.

In one embodiment, the "submit" button is not enabled prior to the confirmation via the mobile phone (117) at the phone number (123). For example, the "submit" button may be disabled, or hidden, or not rendered, before the user finishes the confirmation via the mobile phone (117). After the user completes the communication to confirm the transaction, the interchange (101) may cause the "submit" button to be enabled, revealed, and/or displayed.

For example, upon the completion of the confirmation process, the interchange (101) may communicate directly with the server (113) to indicate the status of the confirmation. Subsequently, when the web page checks with the server (113) for an updated status, the "submit" button is enabled, revealed, and/or displayed. In this approach, the web page may receive additional parameters from the user, collected via the web page, in addition to the formal submission of the purchase request. The additional parameters may include delivery options, addresses, preferences, etc.

Alternatively, the interchange (101) may communicate with the user interface (421) to generate the "submit" button within the user interface (421). When selected, the "submit" button generated within the user interface (421) sends a request to the server (113) to complete the transaction.

To improve security, the interchange (101) may include a one time code as a parameter associated with the "submit" button and separately communicate the one time code to the server (113). When the server (113) matches the one time code received via the "submit" button and the one time code received directly from the interchange (101), the server (113) may proceed to complete the transaction.

In one embodiment, the one time code used to verify the authenticity of the "submit" button, as approved by the interchange (101), is separate from the one time code that the interchange (101) communicates with the mobile phone (117) to confirm the transaction. Alternatively, the same one time code may be used. For example, the interchange (101) may provide the one time code to the mobile phone (117) at the phone number (123) and instruct the user to provide the one time code back via the user interface (421). When the user submits the one time code via the user interface (421), the one time code is transmitted to the server (113) from the user interface (421) embedded in the web page of the server (113). The server (113) communicates with the interchange (101) to determine whether the one time code submitted from the user interface (421) is the correct code. If the one time code submitted from the user interface (421) is verified to be the correct code, the server (113) may accept the submission, proceed to complete the transaction, and/or update the web page (or replace the web page with a different page).

Figure 16:
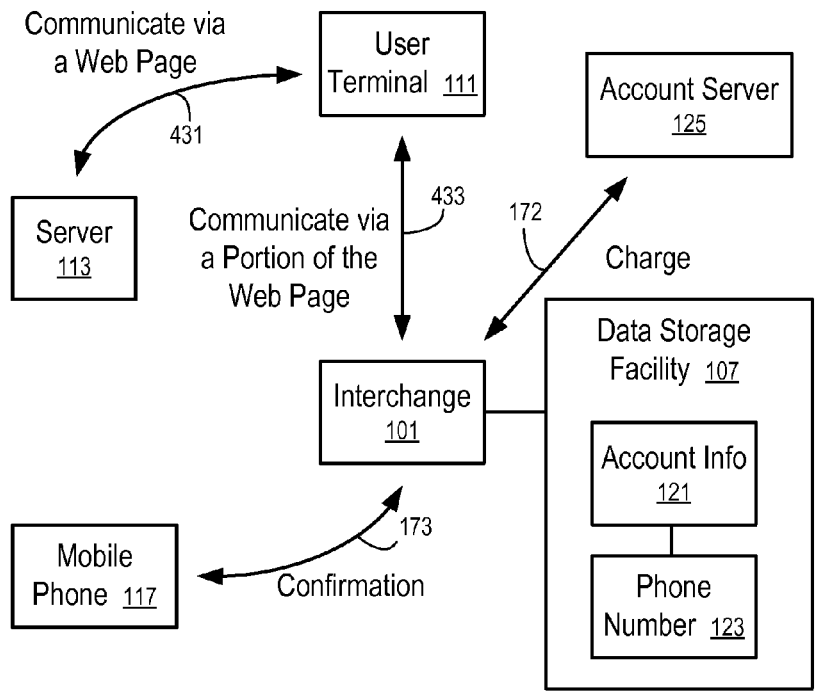
FIGS. 16-18 illustrate communication processes to facilitate the confirmation of transactions according to one embodiment.
Figure 17:
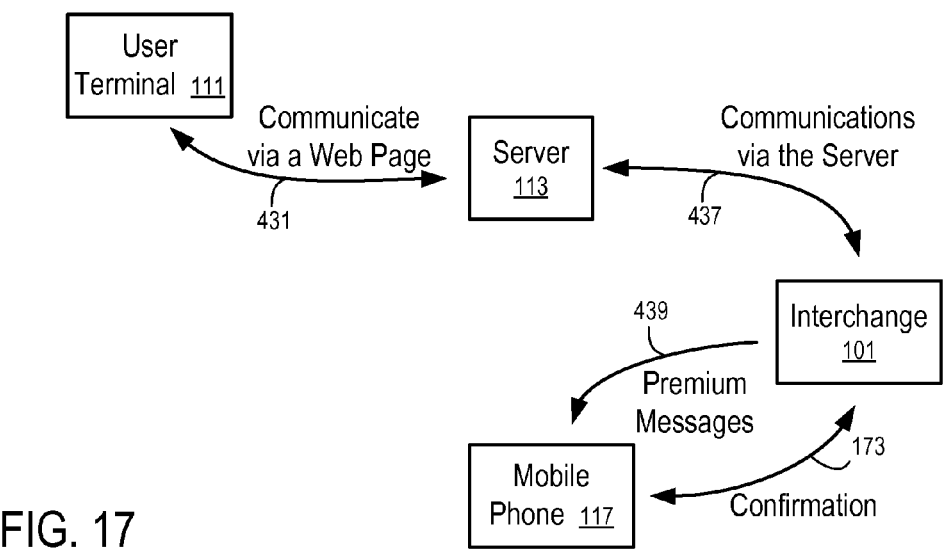
Figure 18:
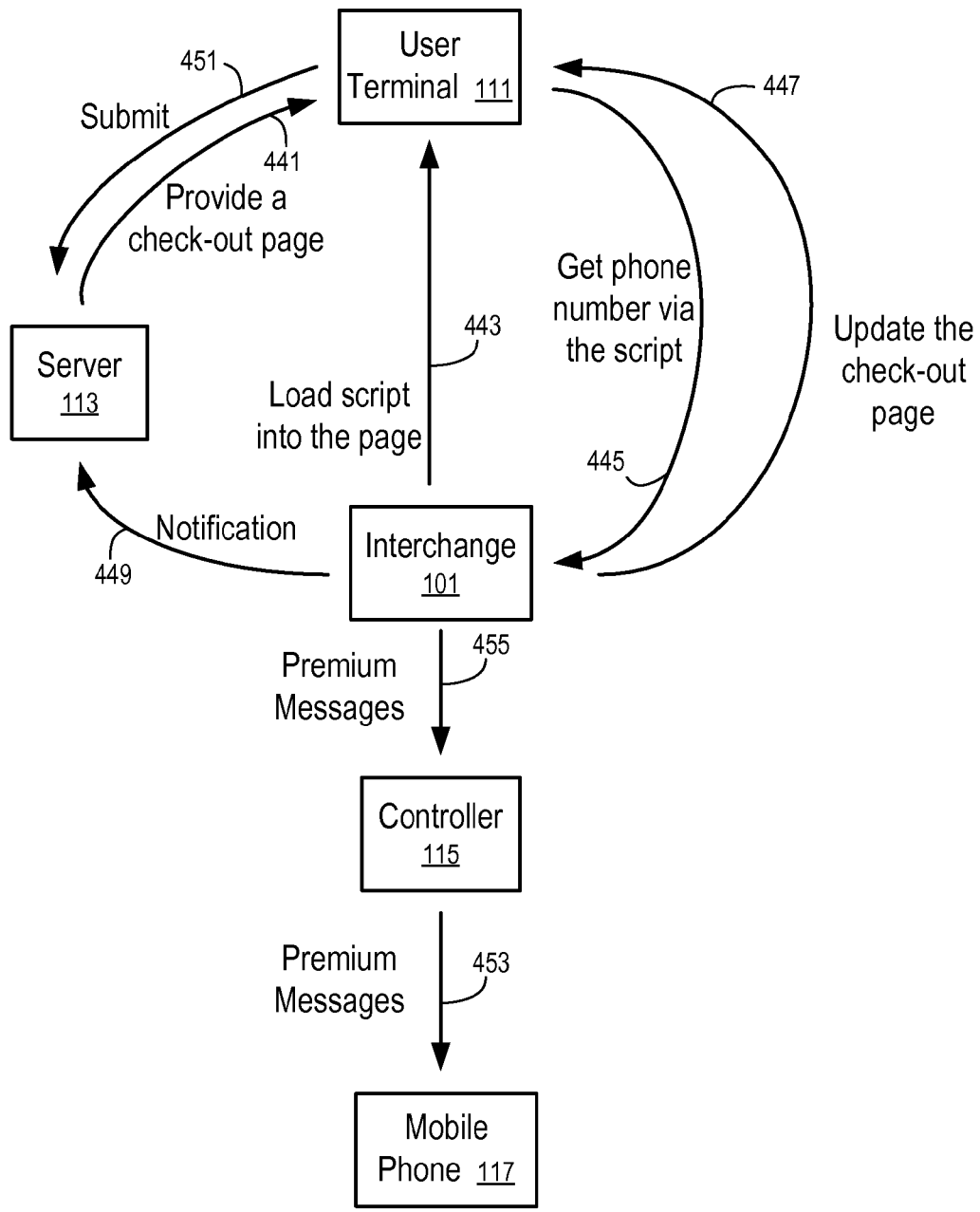

FIGS. 16-18 illustrate communication processes to facilitate the confirmation of transactions according to one embodiment.

In FIG. 16, the user terminal (111) and the server (113) of a seller communicate (431) with each other via a web page. For example, the server (113) provides the details of the transaction to the user terminal (111) via presenting the web page; and the user terminal (111) submits a request to complete the transaction via a "submit" button provided in the web page. The server (113) may or may not update the web page between the initial loading of the web page and the user submitting the request.

In one embodiment, the web page includes a portion that allows the user terminal (111) to directly communicate (433) with the interchange (101) without reloading or refreshing the web page. For example, the user terminal (111) may submit the phone number (123) and/or information about the transaction to the interchange (101) to allow the interchange (101) to confirm the transaction via the mobile phone (117) associated with the phone number (123).

In one embodiment, the confirmation (173) of the transaction with the interchange (101) includes the authorization to use funds associated with the phone number (123) to pay for the transaction. For example, upon the confirmation of the transaction, the interchange (101) may use the account information (121) associated with the phone number (123) to communicate with the account server (125) to charge (172) the account of the user to pay the seller for the transaction.

Alternatively, the interchange (101) may collect funds for the transaction via the telecommunication carrier of the mobile phone (117), via transmitting premium messages to the mobile phone (117).

In FIG. 17, the interchange (101) indirectly communicates with the user terminal (111) via the server (113). For example, the server (113) may relay certain requests or communications to the interchange (101), via background communications (437), for payment processing.

For example, the server (113) may provide the phone number (123) to the interchange (101) to allow the interchange (101) to confirm (173) the transaction with the mobile phone (117) and to send premium messages (439) to the mobile phone (117) to collect funds via the telecommunication carrier.

For example, the interchange (101) may provide a one time code to the server (113) for presentation to the user terminal (111), and request the code back from the mobile phone (117) to confirm the payment for the transaction.

In another embodiment, the interchange (101) may separately provide the one time code to the server (113) and to the mobile phone (117). The server (113) then receives the code back from the user terminal (111) and determines whether the received code is the correct one time code.

In FIG. 17, the interchange (101) transmits the premium message (439) to the mobile phone (117) to collect the funds for the transaction. Alternatively, the interchange (101) may instruct the user of the user terminal (111) to use the mobile phone (117) to transmit premium messages to the interchange (101) to provide funds. Alternatively, the interchange (101) may collect funds via operator bill, credit card, stored value account, or other online payment options.

In FIG. 18, the interchange (101) communicates both with the user terminal (111) and the server (113) to process the payment for a transaction. After the server (113) provides (441) a check-out web page to the user terminal (111), the user terminal (111) loads (443) a script from the interchange (101) for a user interface (421) that is an embedded part of the check-out page. The interchange (101) gets (445) the phone number (123) of the mobile phone (117) from the user terminal (111). After confirming the payment request via the mobile phone (117), the interchange (101) updates (447) the check-out page via the script, without causing the user terminal (111) to reload or refresh the entire check-out page, and provides notification (449) to the server (113) to allow the server (113) to accept a purchase request submitted (451) from the user terminal (111).

In FIG. 18, the interchange (101) transmits (455, 453) premium messages to the mobile phone (117) via a corresponding controller (115) of the mobile phone (117). In other embodiments, the interchange (101) may collect funds via operator bill, credit card, stored value account, or other online payment options.

Figure 19:
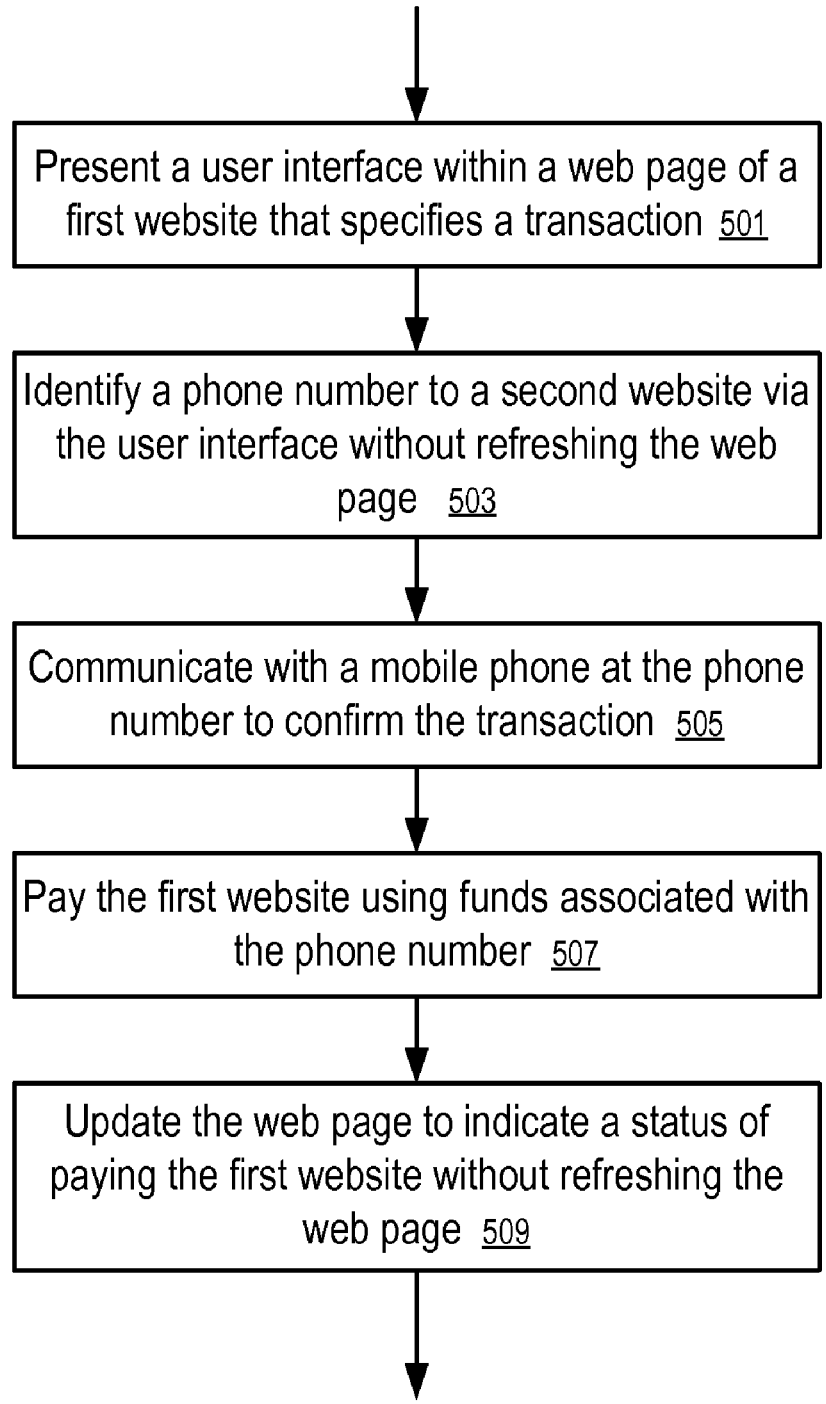
FIG. 19 shows a method to facilitate on-site payments according to one embodiment.

FIG. 19 shows a method to facilitate on-site payments according to one embodiment. In FIG. 19, the interchange (101) presents (501) a user interface (421) within a web page of a first website that is hosted on a server (113) and that specifies a transaction. The user interface (421) identifies (503) a phone number (123) to a second website of the interchange (101) without refreshing the web page loaded from the first website. The interchange (101) communicates (505) with a mobile phone (117) at the phone number (123) to confirm the transaction. Once the transaction is confirmed via the mobile phone (117), the interchange (123) pays (507) the first website using funds associated with the phone number (123), such as an account represented by the account information (121), or the phone bill of the mobile phone (117) at the phone number (123). The interchange (101) then causes the web page to be updated (509) to indicate a status of paying the first website without refreshing the entire web page.

In one embodiment, the interchange (101) communicates with the mobile phone (117) to obtain the confirmation via transmitting a one time code to the mobile phone (117). The interchange (101) may receive the one time code back in the user interface (421) to confirm the transaction without the web page being reloaded, or to receive the one time code back from mobile phone (117) to confirm the transaction.

In one embodiment, the interchange (101) communicates with the mobile phone (117) to obtain the confirmation via transmitting a message to the mobile phone (117) and receiving a reply to the message from the mobile phone (117).

In one embodiment, the interchange (101) provides a one time code in the user interface (421) without the web page being refreshed, and the interchange (101) communicates with the mobile phone (117) to obtain the confirmation via receiving the one time code back from the mobile phone (117) to confirm the transaction.

In one embodiment, the interchange (101) communicates with the mobile phone (117) to obtain the confirmation via receiving a personal identification number (PIN) associated with the phone number (123) to confirm the transaction, without causing the web page to be reloaded.

In some embodiments, the interchange (101) determines a set of premium messages according to an amount of the funds, and transmits the set of premium messages to the mobile phone (117) to cause the telecommunication carrier to collect the funds for the transaction.

In one embodiment, the user interface (421) is rendered according to a reference to a location in the second website of the interchange (101), where the reference is embedded in the web page and includes first information about the transaction provided from the first website to the second website. For example, the first information may include an amount (203) of the funds to be collected.

In one embodiment, the second website of the interchange (101) is configured to provide instructions to render the user interface (421) in response to the reference being loaded in a browser window (201); and the user interface (421) is configured to present the amount (203) of the transaction in the user interface (421) and to request the phone number (123) for the confirmation.

In some embodiments, the first information further includes an identification of the transaction; and the interchange (101) further transmits from the second website to the first website at the server (113) a message, including the identification, to indicate approval of the transaction after the confirmation. Alternatively, the indication of the confirmation may be propagated from the user interface (421) to a portion of the web page outside the user interface (421) to allow the user to continue the transaction with the first website via interacting with the portion of the web page.

In one embodiment, the phone number (123) is communicated from a browser (201) presenting the web page to the second website of the interchange (101) without going through the first website hosted on the server (113).

Figure 20:
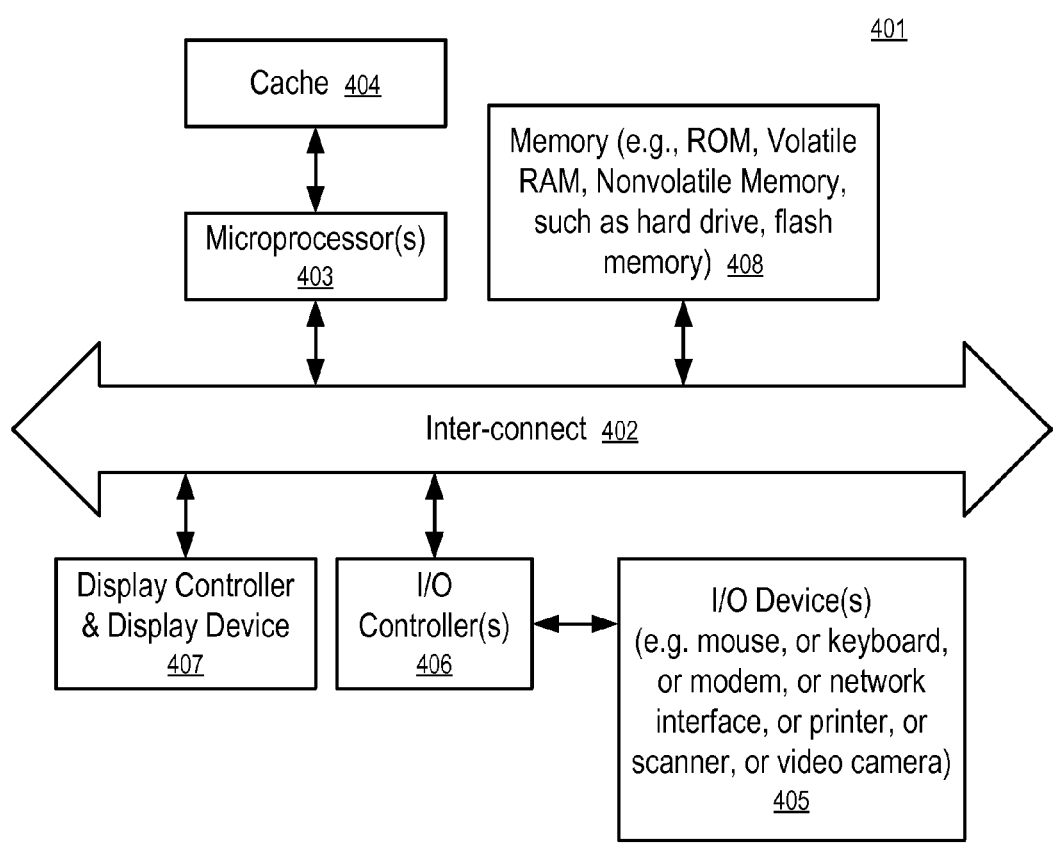
FIG. 20 shows a data processing system, which can be used in various embodiments.

FIG. 20 shows a data processing system, which can be used in various embodiments. While FIG. 20 illustrates various components of a computer system, it is not intended to represent any particular architecture or manner of interconnecting the components. Some embodiments may use other systems that have fewer or more components than those shown in FIG. 20.

In one embodiment, each of the interchange (101), the data storage facility (107), the controllers (115), the mobile phones (117), the user terminals (111), the account server (125) and the servers (113) can be implemented as a data processing system, with fewer or more components, as illustrated in FIG. 20.

In FIG. 20, the data processing system (401) includes an inter-connect (402) (e.g., bus and system core logic), which interconnects a microprocessor(s) (403) and memory (408). The microprocessor (403) is coupled to cache memory (404) in the example of FIG. 20.

The inter-connect (402) interconnects the microprocessor(s) (403) and the memory (408) together and also interconnects them to a display controller, display device (407), and to peripheral devices such as input/output (I/O) devices (405) through an input/output controller(s) (406).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (402) may include one or more buses connected to one another through various bridges, controllers and/or adapters. In one embodiment, the I/O controller (406) includes a USB (Universal Serial Bus) adapter for controlling USB peripherals, and/or an IEEE-1394 bus adapter for controlling IEEE-1394 peripherals.

The memory (408) may include ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computer-implemented method, comprising:
embedding a reference to a user interface on an interchange computer system within a web page of a server computer system, the server computer system being different from the interchange computer system and the reference calling the user interface from the interchange computer system;
transmitting the user interface in response to the call from the reference, the user interface including an identification field to receive an identifier, the web page being transmitted from the server computer system to a user terminal, the user terminal being different from the server computer system and the interchange computer system, and the user interface being located within the web page when displayed at the user terminal such that a user at the user terminal enters the account identifier in the identifier field;

receiving the identifier in the interchange computer system via the user interface displayed within the web page at the user terminal;

processing a charge based on the identifier at the interchange computer system; and displaying in the user interface an indication of the charge without the web page of the server computer system being reloaded.

2. The method of claim 1, further comprising:

communicating with a mobile phone at the phone number received in the interchange computer system via the user interface to obtain a confirmation of a transaction indicated in the web page;

in response to the confirmation, communicating with the mobile phone to collect funds for the transaction via a telecommunication carrier of the mobile phone.

3. The method of claim 2, wherein the communicating with the mobile phone to obtain the confirmation comprises:

transmitting a code to the mobile phone.

4. The method of claim 3, further comprising:

receiving the code in the user interface to confirm the transaction without the web page being reloaded.

5. The method of claim 3, wherein the communicating with the mobile phone to obtain the confirmation comprises:

receiving the code from the mobile phone to confirm the transaction.

6. The method of claim 2, wherein the communicating with the mobile phone to obtain the confirmation comprises:

transmitting a message to the mobile phone; and receiving a reply to the message from the mobile phone.

7. The method of claim 2, further comprising:

providing a code in the user interface without the web page being refreshed, wherein the communicating with the mobile phone to obtain the confirmation comprises receiving the code from the mobile phone to confirm the transaction.

8. The method of claim 1, wherein the communicating with the mobile phone to obtain the confirmation comprises:

receiving a personal identification number (PIN) associated with the phone number to confirm the transaction.

9. The method of claim 1, further comprising:

presenting in the user interface a price associated with the transaction without the web page being reloaded.

10. The method of claim 1, wherein the user interface is implemented via Ajax.

11. The method of claim 1, wherein the user interface is rendered according to a reference to a location in the interchange computer system, the reference being embedded in the web page and including first information about the transaction provided from the server computer system to the interchange computer system.

12. The method of claim 11, wherein the first information includes an amount of funds to be collected.

13. The method of claim 12, wherein the interchange computer system is configured to provide instructions to render the user interface in response to the reference.

14. The method of claim 13, further comprising:

presenting the amount in the user interface to request the phone number for the confirmation.

15. The method of claim 14, wherein the first information further comprises an identification of the transaction, and the method further comprises:

transmitting from the interchange computer system to the server computer system a message, including the identification, to indicate approval of the transaction after the confirmation.

16. The method of claim 14, further comprising:

propagating the indication of the confirmation from the user interface to a portion of the web page outside the user interface to allow the user to continue the transaction with the server computer system via interacting with the portion of the web page.

17. The method of claim 1, wherein the receiving the identifier in the interchange computer system via the user interface presented within the web page at the user terminal comprises: communicating the identifier from a browser presenting the web page to the interchange computer system without going through the server computer system.

18. A non-transitory computer-readable storage media storing instructions, the instructions causing a computer to perform a method, the method comprising:

embedding a reference to a user interface on an interchange computer system within a web page of a server computer system, the server computer system being different from the interchange computer system and the reference calling the user interface from the interchange computer system;

transmitting the user interface in response to the call from the reference, the user interface including an identification field to receive an identifier, the web page being transmitted from the server computer system to a user terminal, the user terminal being different from the server computer system and the interchange computer system, and the user interface being located within the web page when displayed at the user terminal such that a user at the user terminal enters the account identifier in the identifier field;

receiving the identifier in the interchange computer system via the user interface displayed within the web page at the user terminal;

processing a charge based on the identifier at the interchange computer system; and displaying in the user interface an indication of the charge without the web page of the server computer system being reloaded.

* * * * *